US009776447B2

(12) United States Patent
Ikeda et al.

(10) Patent No.: US 9,776,447 B2
(45) Date of Patent: Oct. 3, 2017

(54) INKJET RECORDING SHEET, METHOD FOR MANUFACTURING INKJET RECORDING SHEET, PRINTED ARTICLE, METHOD FOR MANUFACTURING PRINTED ARTICLE, AND ORNAMENTAL GLASS

(71) Applicant: FUJIFILM Corporation, Tokyo (JP)

(72) Inventors: Kimi Ikeda, Fujinomiya (JP); Takashi Shimizu, Fujinomiya (JP); Yoshiki Sugai, Fujinomiya (JP); Takahiro Nakazawa, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/045,710

(22) Filed: Feb. 17, 2016

(65) Prior Publication Data

US 2016/0167416 A1   Jun. 16, 2016

Related U.S. Application Data

(63) Continuation of application No. PCT/JP2014/071636, filed on Aug. 19, 2014.

(30) Foreign Application Priority Data

Aug. 21, 2013 (JP) ................................ 2013-171541
Jan. 31, 2014 (JP) ................................ 2014-017822

(51) Int. Cl.
| | | |
|---|---|---|
| *B41M 5/00* | (2006.01) | |
| *B41M 5/52* | (2006.01) | |
| *B41M 5/50* | (2006.01) | |
| *B41M 7/00* | (2006.01) | |
| *B05D 3/06* | (2006.01) | |
| *B32B 27/16* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |

(52) U.S. Cl.
CPC ............ *B41M 5/5209* (2013.01); *B05D 3/06* (2013.01); *B32B 7/12* (2013.01); *B32B 27/08* (2013.01); *B32B 27/16* (2013.01); *B32B 27/308* (2013.01); *B32B 27/32* (2013.01); *B32B 27/36* (2013.01); *B32B 27/40* (2013.01); *B41M 5/502* (2013.01); *B41M 5/508* (2013.01); *B41M 5/5227* (2013.01); *B41M 5/5272* (2013.01); *B41M 5/5281* (2013.01); *B41M 7/00* (2013.01); *B32B 2255/10* (2013.01); *B32B 2255/26* (2013.01); *B32B 2307/412* (2013.01); *B41M 5/504* (2013.01); *B41M 5/506* (2013.01)

(58) Field of Classification Search
CPC ...... B41M 5/502; B41M 5/504; B41M 5/506; B41M 5/508; B41M 5/5209; B41M 5/5227; B41M 5/5272; B41M 5/5281; B41M 7/00; B05D 3/06
See application file for complete search history.

(56) References Cited

U.S. PATENT DOCUMENTS

| | | | |
|---|---|---|---|
| 6,096,469 A * | 8/2000 | Anderson | B41M 5/52 423/335 |
| 6,475,585 B1 | 11/2002 | Yamanashi et al. | |
| 6,555,240 B1 | 4/2003 | Nishikori et al. | |
| 6,652,087 B2 | 11/2003 | Furukawa | |
| 7,199,182 B2 | 4/2007 | Tanaka et al. | |
| 7,521,126 B2 | 4/2009 | Taki et al. | |
| 2002/0012747 A1* | 1/2002 | Lindenberg | B44C 5/0407 65/23 |
| 2002/0149658 A1 | 10/2002 | Furukawa | |
| 2003/0103129 A1 | 6/2003 | Tanaka et al. | |
| 2005/0270357 A1* | 12/2005 | Kawai | B26D 5/34 347/105 |
| 2006/0227439 A1 | 10/2006 | Taki et al. | |

(Continued)

FOREIGN PATENT DOCUMENTS

| | | |
|---|---|---|
| CN | 1219721 A | 6/1999 |
| CN | 1518504 A | 8/2004 |
| JP | H09-142009 A | 6/1997 |

(Continued)

OTHER PUBLICATIONS

Notification of Transmittal of Translation of the International Preliminary Report on Patentability (Chapter I) and Translation of Written Opinion of the International Searching Authority; PCT/JP2014/071636 issued on Mar. 3, 2016.

(Continued)

*Primary Examiner* — Betelhem Shewareged
(74) *Attorney, Agent, or Firm* — Studebaker & Brackett PC

(57) ABSTRACT

Provided is an inkjet recording sheet which includes a transparent support and an ink receiving layer disposed on one surface of the transparent support, in which the ink receiving layer is a layer formed by curing a composition containing at least a polymerization initiator and a polymerizable compound. When a printed article and ornamental glass are manufactured by forming an image portion by an inkjet method, the inkjet recording sheet is excellent in both the ink adhesiveness and the scratch resistance of the ink receiving layer including the image portion and a non-image portion. Also provided is a method for manufacturing an inkjet recording sheet, a printed article, a method for manufacturing a printed article, and ornamental glass.

9 Claims, 2 Drawing Sheets

(56) References Cited

U.S. PATENT DOCUMENTS

2008/0192102 A1* 8/2008 Leenders ............ B41M 3/14
347/102
2011/0052843 A1* 3/2011 Dontula ............... B41M 5/41
428/32.52

FOREIGN PATENT DOCUMENTS

| JP | H11-042849 A | 2/1999 |
|---|---|---|
| JP | H11-126023 A | 5/1999 |
| JP | H11-170685 A | 6/1999 |
| JP | H11-219117 A | 8/1999 |
| JP | H11-316547 A | 11/1999 |
| JP | 2000-211249 A | 8/2000 |
| JP | 2001-072950 A | 3/2001 |
| JP | 2001-150612 A | 6/2001 |
| JP | 2001-232738 A | 8/2001 |
| JP | 2001-262091 A | 9/2001 |
| JP | 2002-011942 A | 1/2002 |
| JP | 2002-079751 A | 3/2002 |
| JP | 2002-225415 A | 8/2002 |
| JP | 2004-532144 A | 10/2004 |
| JP | 2005-097571 A | 4/2005 |
| JP | 2007-283613 A | 11/2007 |
| JP | 2008-260139 A | 10/2008 |
| JP | 2010-047015 A | 3/2010 |
| JP | 2010-099862 A | 5/2010 |
| JP | 2010-208307 A | 9/2010 |
| JP | 2011-505283 A | 2/2011 |
| JP | 2012-046687 A | 3/2012 |
| WO | 02/085638 A1 | 10/2002 |
| WO | 03/002353 A1 | 1/2003 |
| WO | 2004/060687 A1 | 7/2004 |
| WO | 2009/071884 A1 | 6/2009 |

OTHER PUBLICATIONS

International Search Report and Written Opinion—PCT/JP2014/071636 dated Dec. 2, 2014.
An Office Action; "Notification of Reasons for Rejection," issued by the Japanese Patent Office dated Sep. 6, 2016, which corresponds to Japanese Patent Application No. 2014-166010 and is related to U.S. Appl. No. 15/045,710; with English language translation.
An Office Action; "Decision of Refusal," issued by the Japanese Patent Office dated Dec. 20, 2016, which corresponds to Japanese Patent Application No. 2014-166010 and is related to U.S. Appl. No. 15/045,710; with English language translation.
An Office Action; "Notification of Reason for Refusal," issued by the Korean Patent Office dated Jan. 10, 2017, which corresponds to Korean Patent Application No. 10-2016-7002466 and is related to U.S. Appl. No. 15/045,710; with English language translation.
A First Office Action issued by the Chinese Patent Office dated Dec. 8, 2016, which corresponds to Chinese Patent Application No. 201480044944.7 and is related to U.S. Appl. No. 15/045,710; with English language translation.

* cited by examiner

INKJET RECORDING SHEET, METHOD FOR MANUFACTURING INKJET RECORDING SHEET, PRINTED ARTICLE, METHOD FOR MANUFACTURING PRINTED ARTICLE, AND ORNAMENTAL GLASS

CROSS-REFERENCE TO RELATED APPLICATIONS

This application is a Continuation of PCT International Application No. PCT/JP2014/071636, filed on Aug. 19, 2014, which claims priority under 35 U.S.C. Section 119(a) to Japanese Patent Application No. 2013-171541 filed on Aug. 21, 2013 and Japanese Patent Application No. 2014-017822 filed on Jan. 31, 2014. Each of the above applications is hereby expressly incorporated by reference, in its entirety, into the present application.

BACKGROUND OF THE INVENTION

1. Field of the Invention

The present invention relates to an inkjet recording sheet, a method for manufacturing an inkjet recording sheet, a printed article, a method for manufacturing a printed article, and ornamental glass.

2. Description of the Related Art

Inkjet methods in which an ink composition is ejected in the form of droplets from an ink ejection port use a small device, are inexpensive, and can form an image on a recording medium in a non-contact manner. Therefore, the ink jet methods are used in many printers. Among the inkjet methods, a piezoelectric inkjet method, in which an ink is ejected by utilizing the deformation of a piezoelectric element, and a thermal inkjet method, in which an ink composition is ejected in the form of droplets by utilizing the boiling phenomenon of the ink composition caused by thermal energy, feature high resolution and excellent high-speed printing properties.

In recent years, not only photo printers or document printers for home use or office use, but also commercial printers or industrial printers using inkjet printers have been developed. Particularly, there is a rapidly increasing demand for a wide format inkjet printer which is suitable for printing a large size advertisement, such as ornamental glass obtained by sticking a printed article formed by printing letters or patterns on an inkjet recording sheet for ornamenting windows to the glass of a show window or an automatic door, and performs UV irradiation immediately after the ejection of ink droplets. The printed article used in the ornamental glass or the inkjet recording sheet for ornamenting windows for forming the printed article is required to have an ink receiving layer that has both ink adhesiveness and scratch resistance.

As the ink used in the wide format inkjet printer, a radiation curable type ink cured by radiation such as ultraviolet rays is generally used. The ink is classified into a non-aqueous ink containing an organic solvent and a solventless ink not containing an organic solvent. Because the organic solvent dissolves a resin forming the ink receiving layer on the recording sheet, the ink easily dyes the ink receiving layer, and the adhesiveness of the ink is easily obtained.

However, because of the necessity for a step of volatilizing the organic solvent and the problem of the working environment in which the organic solvent (VOC) is handled, the use of a radiation curable type solventless ink is desired. Because the radiation curable type solventless ink does not dissolve the ink receiving layer, the ink does not easily dye the ink receiving layer. Furthermore, the adhesion between the radiation curable type ink and the recording medium needs to be further improved.

For example, JP2001-232738A suggests a method for improving the adhesion to a UV curable type ink by using a recording layer composed of at least one kind of resin selected from polyester, polyurethane, acryl, and polyester urethane resins. JP2002-11942A suggests a method for improving printing properties with respect to a wide format inkjet printer and a pigment (UV) ink by forming an ink receiving layer composed of aqueous polyurethane, a porous pigment, and magnesium chloride. JP2010-47015A suggests a method for improving printing suitability with respect to an organic solvent-containing non-aqueous ink by forming an ink receiving layer formed of a urethane/acryl blend or a blend of two or more kinds of urethane.

SUMMARY OF THE INVENTION

However, as a result of investigating the methods described in JP2001-232738A, JP2002-11942A, and JP2010-47015A, the inventors of the present invention found that in order to use the methods for ornamental glass, both the ink adhesiveness and the scratch resistance need to be improved.

The present invention has been made to solve the above problems, and an object thereof is to provide an inkjet recording sheet which is excellent in both the ink adhesiveness and the scratch resistance of the ink receiving layer including an image portion and a non-image portion when used for manufacturing a printed article and ornamental glass by forming the image portion through an inkjet method.

In order to solve the aforementioned problems, the inventors of the present invention conducted an intensive investigation. As a result, they obtained knowledge that by adopting a constitution in which an ink receiving layer in an inkjet recording sheet is formed by curing a composition containing a polymerization initiator and a polymerizable compound, the ink adhesiveness of a printed article at the time of forming an image portion on the inkjet recording sheet by an inkjet method is improved, and the scratch resistance is also improved. Based on the knowledge, the inventors accomplished the present invention.

Specifically, the aforementioned problems were solved by the following solving means [1], preferably by the following solving means [2] to [18].

1 [1] An inkjet recording sheet including a transparent support and an ink receiving layer disposed on one surface side of the transparent support, in which the ink receiving layer is a layer formed by curing a composition containing at least a polymerization initiator and a polymerizable compound.

1 [2] The inkjet recording sheet described in [1], preferably further including an adhesive layer on the other surface side of the transparent support opposite to the surface on which the ink receiving layer is disposed.

1 [3] The inkjet recording sheet described in [1] or [2], in which the transparent support is preferably a polyethylene terephthalate film.

1 [4] The inkjet recording sheet described in any one of [1] to [3], preferably further including an interlayer constituted with a single layer or two or more layers, at least between the ink receiving layer and the transparent support or between the adhesive layer and the transparent support.

1 [5] The inkjet recording sheet described in [4], in which the interlayer preferably contains at least one kind of resin among a polyester-based resin, a polyurethane-based resin, an acrylic resin, and a polyolefin-based resin.

1 [6] The inkjet recording sheet described in [4] or [5], in which at least one of the layers constituting the interlayer is preferably an interlayer B having a thickness of equal to or greater than 0.1 µm and containing a polyolefin-based resin in a proportion of equal to or greater than 10%.

1 [7] The inkjet recording sheet described in [6], in which the interlayer is preferably constituted with two or more layers, at least one of the layers constituting the interlayer is preferably an interlayer C containing at least one kind of resin among a polyester-based resin and a polyurethane-based resin, and the interlayer B and the interlayer C are preferably disposed in this order from the transparent support.

1 [8] The inkjet recording sheet described in any one of [4] to [7], in which the interlayer preferably includes an interlayer A having a thickness of less than 0.1 µm.

1 [9] The inkjet recording sheet described in any one of [1] to [8], in which the ink receiving layer preferably contains a surfactant.

1 [10] The inkjet recording sheet described in any one of [1] to [9] that is preferably used for ornamenting glass.

1 [11] A method for manufacturing an inkjet recording sheet, including a step of forming an ink receiving layer on one surface of a transparent support, in which the step of forming an ink receiving layer is a step of curing a composition containing at least a polymerization initiator and a polymerizable compound.

1 [12] The method for manufacturing an inkjet recording sheet described in [11], in which the polymerization initiator is preferably a photopolymerization initiator, and the step of curing a composition is preferably a photosensitive curing step of irradiating the composition with ultraviolet rays.

1 [13] The method for manufacturing an inkjet recording sheet described in [12], in which in the photosensitive curing step, the irradiation amount of the ultraviolet rays is preferably 10 mJ/cm$^2$ to 200 mJ/cm$^2$.

1 [14] The method for manufacturing an inkjet recording sheet described in any one of [11] to [13], preferably further including a first stretching step of stretching a film for a transparent support in a film transport direction or in a direction orthogonal to the film transport direction, a step of coating at least one surface of the film for a transparent support having undergone the first stretching step with a coating solution for forming an interlayer, and a second stretching step of stretching the film for a transparent support coated with the coating solution for forming an interlayer in a direction orthogonal to the stretching direction in the first stretching step so as to form the transparent support and an interlayer having a thickness of less than 0.1 µm.

1 [15] An inkjet recording sheet manufactured by the method for manufacturing an inkjet recording sheet described in any one of [11] to [14].

1 [16] A method for manufacturing a printed article, including a step of ejecting an ink composition from an inkjet recording device onto the inkjet recording sheet described in any one of [1] to [10] and [15], and a step of forming an image portion by curing the ejected ink composition by irradiating the ink composition with radiation.

1 [17] A printed article manufactured by the method for manufacturing a printed article described in [16].

1 [18] Ornamental glass including glass and the printed article described in [17] disposed on the glass.

According to the present invention, it is possible to provide an inkjet recording sheet which is excellent in both the ink adhesiveness and the scratch resistance of the ink receiving layer including an image portion and a non-image portion when used for manufacturing a printed article and ornamental glass by forming the image portion through an inkjet method.

DESCRIPTION OF THE PREFERRED EMBODIMENTS

Hereinafter, the present invention will be specifically described. The following constituents will be described based on typical embodiments of the present invention in some cases, but the present invention is not limited to such embodiments. In the specification of the present application, "to" is used to signify a range that includes numerical values listed before and after "to" as a lower limit and an upper limit respectively.

[Inkjet Recording Sheet]

The inkjet recording sheet of the present invention has a transparent support and an ink receiving layer disposed on one surface side of the transparent support, and the ink receiving layer is a layer formed by curing a composition containing at least a polymerization initiator and a polymerizable compound.

If such a constitution is adopted, when a printed article and ornamental glass are manufactured by forming an image portion on the inkjet recording sheet of the present invention by an inkjet method, both the ink adhesiveness and the scratch resistance of the ink receiving layer including the image portion and the non-image portion become excellent. When a printed article and ornamental glass are manufactured by forming an image portion on the inkjet recording sheet of the present invention by an inkjet method, both the ink adhesiveness and the scratch resistance of the ink receiving layer including the image portion and a non-image portion become better in the ink receiving layer, which is a layer formed by curing a composition containing a polymerization initiator and a polymerizable compound, than in a layer formed by curing a polymer such as a resin binder by using a cross-linking agent or the like.

Figure 1:
FIG. 1 is a schematic cross-sectional view of an example of an inkjet recording sheet of the present invention.

As illustrated in FIG. 1, an inkjet recording sheet 10 of the present invention has a transparent support 1 and an ink receiving layer 2 disposed on one surface side of the transparent support 1. The ink receiving layer 2 may be disposed on at least one surface side of the transparent support 1 or may be disposed on both surfaces of the transparent support 1. From the viewpoint of disposing an adhesive layer which will be described later, it is preferable that the ink receiving layer 2 is disposed only on one surface thereof.

Figure 2:
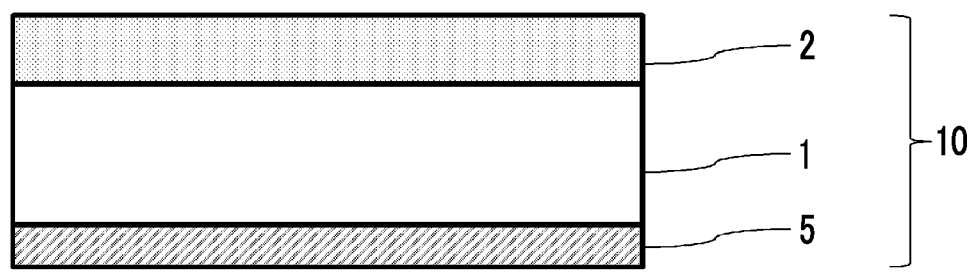
FIG. 2 is a schematic cross-sectional view of another example of the inkjet recording sheet of the present invention.
Figure 3:
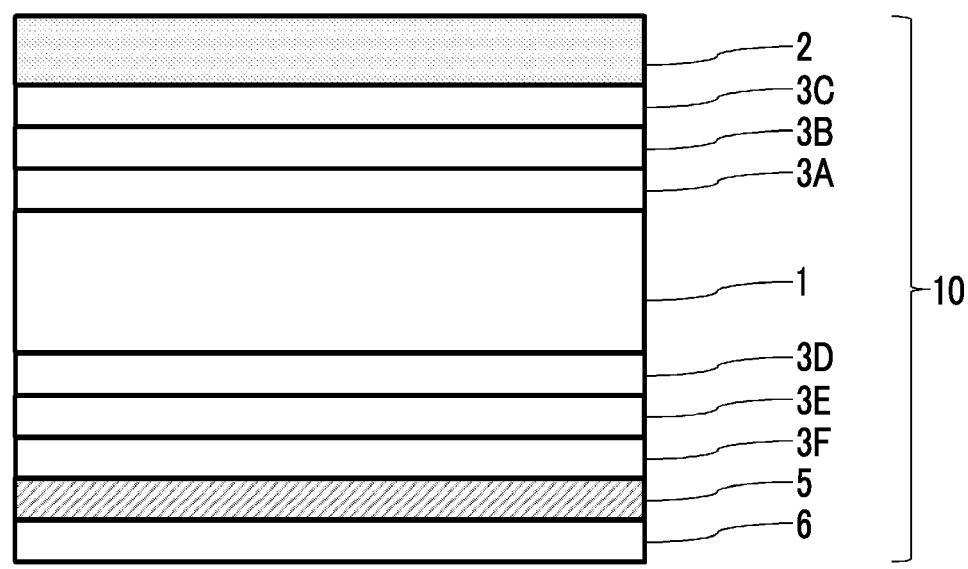
FIG. 3 is a schematic cross-sectional view of another example of the inkjet recording sheet of the present invention.

As illustrated in FIG. 2, the inkjet recording sheet 10 of the present invention preferably has an adhesive layer 5 on the other surface side of the transparent support 1 opposite to the surface on which the ink receiving layer 2 is disposed. As illustrated in FIG. 3, the inkjet recording sheet 10 of the present invention preferably has a release film 6 on the adhesive layer 5.

As illustrated in FIG. 3, the inkjet recording sheet 10 of the present invention preferably has interlayers 3A, 3B, 3C, 3D, 3E, and 3F constituted with a single layer or two or more layers, at least between the ink receiving layer 2 and the transparent support 1 or between the adhesive layer 5 and the transparent support 1. FIG. 3 shows an aspect in which three interlayers 3A, 3B, and 3C are disposed in this order from the transparent support 1 between the ink receiving layer 2 and the transparent support 1 and the three interlayers 3D, 3E, and 3F are disposed in this order from the transparent support 1 between the adhesive layer 5 and the transparent support 1. However, the present invention is not limited to the embodiment, and the number and order of the interlayers are not particularly limited.

Hereinafter, each member will be described.

<Transparent Support>

As the transparent support, a known support can be used. Examples thereof include a plastic film (for example, polyester, polyethylene, polypropylene, polystyrene, a cyclic olefin-based resin, polyvinyl alcohol, polycarbonate, and cellulose ester such as triacetyl cellulose) and the like.

The transparency of the transparent support refers to the properties of having a transmittance of equal to or greater than 80% with respect to light rays having a wavelength in a range of 380 nm to 780 nm The transparent support is preferably a film containing polyester as a main component, and may contain an additive such as a plasticizer. The polyester is not particularly limited, and for example, polyethylene terephthalate, polyethylene naphthalate, polubutylene terephthalate, or polybutylene naphthalate is used. Among these, from the viewpoint of the cost and the mechanical strength, polyethylene terephthalate is particularly preferable. The main component means a component contained in the transparent support in a proportion of equal to or greater than 50% by mass.

From the viewpoint of improving the mechanical strength of the support, a transparent support having undergone a stretching treatment is preferable, and a biaxially stretched transparent support is particularly preferable. The stretching ratio is not particularly limited, but is preferably within a range of equal to or greater than 1.5-fold and equal to or less than 7-fold. If the stretching ratio is less than 1.5-fold, the mechanical strength is insufficient in some cases. Inversely, if the stretching ratio is greater than 7-fold, the uniformity of the thickness becomes defective in some cases. The stretching ratio is more preferably within a range of equal to or greater than 2-fold and equal to or less than 5-fold. It is particularly preferable that the transparent support is stretched in two directions orthogonal to each other at a stretching ratio within a range of equal to or greater than 2-fold and equal to or less than 5-fold.

The thickness of the transparent support is kept constant within a range of, for example, equal to or greater than 30 μm and equal to or less than 500 μm, and more preferably kept constant within a range of equal to or greater than 50 μm and equal to or less than 300 μm. If the thickness of the support is less than 30 μm, the support becomes bendy, so it is difficult to handle it in some cases. In contrast, if the thickness of the support is greater than 500 μm, it is difficult to reduce the size or weight of a display device, and there are disadvantages in terms of cost.

Furthermore, as the transparent support, it is preferable to use a transparent support in which at least one of two surfaces thereof has undergone a surface treatment such as a corona discharge treatment, a vacuum glow discharge treatment, or a flame treatment. Through the surface treatment, either or both of two surfaces of the support can be hydrophilized, and thus the wettability of various aqueous coating solutions can be improved. In addition, it is possible to introduce a functional group such as a carboxyl group or a hydroxy group into the support. As a result, it is possible to further improve the adhesion between one surface of the support and the ink receiving layer or the interlayer.

<Ink Receiving Layer>

The ink receiving layer is a layer which is disposed on one surface side of the transparent support and is formed by curing a composition containing at least a polymerization initiator and a polymerizable compound. If necessary, the ink receiving layer may contain other components.

(Polymerizable Compound)

The polymerizable compound is not particularly limited, and known polymerizable compounds can be used. The polymerizable compound may be a photosensitive compound or a thermally polymerizable compound. In the present invention, in order to accomplish both the scratch resistance and the ink adhesiveness, it is preferable to use a photosensitive compound. It is more preferable to select a UV curable compound (a monomer from which a UV curable resin is obtained).

The polymerizable compound in the present invention is preferably an addition polymerizable compound having at least one ethylenically unsaturated double bond. The polymerizable compound is more preferably selected from compounds having at least one ethylenically unsaturated bond and preferably having two or more ethylenically unsaturated bonds on a terminal thereof. These compounds are widely known in the technical field to which the present invention belongs, and can be used in the present invention without particular limitation.

These compounds have a chemical form such as a monomer or a prepolymer, that is, a dimer, a trimer, an oligomer, a mixture of these, and a copolymer of these. As the polymerizable compound, those described in paragraphs "0116" to "0126" of JP2011-127096A can be used, and the content of the gazette is incorporated into the present invention.

Examples of the monomer and the copolymer thereof include unsaturated carboxylic acid (for example, acrylic acid, methacrylic acid, itaconic acid, crotonic acid, isocrotonic acid, or maleic acid), esters thereof, and amides thereof. Among these, esters of unsaturated carboxylic acid and an aliphatic polyol compound and amides of unsaturated carboxylic acid and an aliphatic polyamine compound are preferably used. Furthermore, a product of an addition reaction between unsaturated carboxylic acid esters or unsaturated carboxylic acid amides having a nucleophilic substituent such as a hydroxyl group, an amino group, or a mercapto group and monofunctional or polyfunctional isocyanates or epoxies; a product of a dehydrocondensation reaction between the aforementioned unsaturated carboxylic acid esters or unsaturated carboxylic acid amides and monofunctional or polyfunctional carboxylic acid; and the like are preferably used. In addition, a product of an addition reaction between unsaturated carboxylic acid esters or unsaturated carboxylic acid amides having an electrophilic substituent such as an isocyanate group or an epoxy group and monofunctional or polyfunctional alcohols, amines, or thiols; and a product of a substitution reaction between unsaturated carboxylic acid esters or unsaturated carboxylic acid amides having a dissociative substituent such as a halogen group or a tosyloxy group and monofunctional or polyfunctional alcohols, amines, or thiols are also preferable. Moreover, for example, it is possible to use a group of compounds obtained by substituting the aforementioned unsaturated carboxylic acid with unsaturated phosphonic acid, styrene, vinylether, or the like.

Specific examples of the monomer of the ester of the aliphatic polyol compound and the unsaturated carboxylic acid include an acrylic acid ester such as ethylene glycol diacrylate, triethylene glycol diacrylate, 1,3-butanediol diacrylate, tetramethylene glycol diacrylate, propylene glycol diacrylate, neopentyl glycol diacrylate, trimethylol propane triacrylate, trimethylolpropane ethylene oxide-modified (hereinafter, described as "EO-modified") triacrylate, trimethylolpropane tris(acryloyloxypropyl) ether, trimethylolethane triacrylate, hexane diol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tris (acryloyloxyethyl) isocyanurate, polyester acrylate oligomer, isocyanuric acid EO-modified triacrylate, or the like.

As esters other than these, for example, aliphatic alcohol-based esters described in JP1976-47334B (JP-S51-47334B) and JP1982-196231A (JP-S57-196231A), esters having an aromatic skeleton described in JP1984-5240A (JP-S59-5240A), JP1984-5241A (JP-S59-5241A), and JP-1990-226149A (JP-H02-226149A), esters containing an amino group described in JP1989-165613A (JP-H01-165613A), and the like are also preferably used. The aforementioned ester monomers can be used as a mixture.

Specific examples of the monomer of amide of an aliphatic polyamine compound and unsaturated carboxylic acid include methylenebis-acrylamide, methylenebis-methacrylamide, 1,6-hexamethylenebis-acrylamide, 1,6-hexamethylenebis-methacrylamide, diethylenetriamine trisacrylamide, xylylenebisacrylamide, xylylenebismethacrylamide, and the like.

Examples of other preferred amide-based monomers include the monomers having a cyclohexylene structure described in JP1979-21726B (JP-S54-21726B).

Furthermore, a urethane-based addition polymerizable compound manufactured by using an addition reaction between isocyanate and a hydroxyl group is also preferable, and specific examples thereof include a vinyl urethane compound containing two or more polymerizable vinyl groups in a single molecule that is obtained by adding a vinyl monomer, which is represented by the following Formula (V) and has a hydroxyl group, to a polyisocyanate compound described in JP1973-41708B (JP-S48-41708B) having two or more isocyanate groups in a single molecule.

In the following Formula (V), each of $R^7$ and $R^8$ independently represents a hydrogen atom or a methyl group.

H₂C=C(R⁷)COOCH₂CH(R⁸)OH                    Formula (V)

In addition, the urethane acrylates described in JP1976-37193A (JP-S51-37193A), JP1990-32293B (JP-H02-32293B), and JP1990-16765B (JP-H02-16765B) or the urethane compounds having an ethylene oxide-based skeleton described in JP1983-49860B (JP-S58-49860B), JP1981-17654B (JP-S56-17654B), JP1987-39417B (JP-S62-39417B), and JP1987-39418B (JP-S62-39418B) are also preferable. Furthermore, if the polymerizable compounds having an amino structure or a sulfide structure in a molecule that are described in JP1988-277653A (JP-S63-277653A), JP1988-260909A (JP-S63-260909A), and JP1989-105238A (JP-H01-105238A) are used, a (photosensitive) composition extremely excellent in photo-sensing speed can be obtained.

The examples also include the polyfunctional acrylate or methacrylate such as polyester acrylates or epoxy acrylates obtained by reacting an epoxy resin with (meth)acrylic acid as described in JP1973-64183A (JP-S48-64183A), JP1974-43191B (JP-S49-43191B), and JP1977-30490B (JP-S52-30490B); specific unsaturated compounds described in JP1971-43946B (JP-S46-43946B), JP1989-40337B (HP-H01-40337B), and JP1989-40336B (JP-H01-40336B); the vinyl phosphonate-based compound described in JP1990-25493A (JP-H02-25493A); and the like. In some cases, the structure containing a perfluoroalkyl group described in JP 1986-22048A (JP-H61-22048A) is preferably used. Furthermore, the photocurable monomer and oligomer described in The Journal of The Adhesion Society of Japan, Vol. 20, No. 7, pp 300-308 (1984) can also be used.

The details of how to use these polymerizable compounds, such as the structure thereof, whether they are used singly or concurrently, and the amount thereof added, can be arbitrarily set according to the design of the final performance of the composition containing a polymerization initiator and a polymerizable compound. For example, from the viewpoint described below, the polymerizable compounds are selected.

In view of the sensitivity, it is preferable that the polymerizable compound has a structure containing many unsaturated groups per single molecule. In many cases, it is preferable that the polymerizable compound has two or more functional groups. In order to enhance the strength of the cured film, it is preferable that the polymerizable compound has three or more functional groups.

In view of the compatibility between the polymerizable compound and other components (for example, a polymerization initiator and a light shielding material (a pigment or a dye) such as titanium dioxide) contained in the composition containing a polymerization initiator and a polymerizable compound and in view of the dispersibility, the selection of the polymerizable compound and/or how to use the polymerizable compound is an important factor. For example, if a low-purity compound is used or if two or more kinds of other components are concurrently used, the compatibility can be further improved in some cases. Furthermore, for the purpose of improving the adhesiveness with respect to the hard surface of a substrate or the like, a specific structure can be selected.

In the present invention, the polymerizable compound is preferably the monomer of the ester of an aliphatic polyol compound and unsaturated carboxylic acid, more preferably an acrylic acid ester or a methacrylic acid ester, and particularly preferably an acrylic acid ester.

From the viewpoint of controlling the physical properties such as a modulus of elasticity of the film, it is preferable to concurrently use two or more kinds of polymerizable compounds. Particularly, from the viewpoint of the ink adhesiveness and the scratch resistance, a combination of (meth) acrylate having two or more functional groups and EO-modified (meth)acrylate having two or more functional groups is preferable.

The polymerizable compound may be completely cured at the time of forming the ink receiving layer, and thus the polymerizable group may not remain in the ink receiving layer. Alternatively, by forming the ink receiving layer at a reduced curing ratio, the polymerizable group may remain in the ink receiving layer. However, from the viewpoint of obtaining excellent ink adhesiveness, it is preferable to cause the polymerizable group (ethylenically unsaturated bond) to remain by reducing the curing ratio.

The method for leaving the polymerizable group of the polymerizable compound in the ink receiving layer is not particularly limited, and for example, it is possible to use a method in which the UV exposure amount is reduced so as to cause the ethylenically unsaturated bond to remain. This method will be explained in a method for manufacturing an inkjet recording sheet of the present invention that will be described later.

The content of the polymerizable compound in the ink receiving layer or in the total solid content of the composition containing a polymerization initiator and a polymerizable compound for forming the ink receiving layer is preferably within a range of 50% by mass to 99% by mass, more preferably within a range of 80% by mass to 98% by mass, and even more preferably within a range of 90% by mass to 97% by mass.

It is preferable that the content is within the above range because then the ink adhesiveness becomes excellent.

(Polymerization Initiator)

The composition containing a polymerization initiator and a polymerizable compound also contains a polymerization initiator.

As the polymerization initiator in the present invention, it is possible to use those known as polymerization initiators described below. As the polymerization initiator, those described in paragraphs "0128" to "0177" of JP2011-127096A can be used.

The polymerization initiator is not particularly limited as long as it has an ability to initiate the polymerization of a polymerizable compound and can be appropriately selected from known polymerization initiators. For example, a polymerization initiator which exhibits photosensitivity with respect to light rays of ultraviolet rays to visible rays is preferable. Furthermore, the polymerization initiator may be an activator which generates an active radical through a certain interaction with a photoexcited sensitizer or may be an initiator which initiates cationic polymerization according to the type of the monomer.

Examples of the polymerization initiator include a halogenated hydrocarbon derivative (for example, a halogenated hydrocarbon derivative having a triazine skeleton or an oxadiazole skeleton), an acyl phosphine compound such as acyl phosphine oxide, hexaarylbiimidazole, an oxime compound such as an oxime derivative, organic peroxide, a thio compound, a ketone compound, an aromatic onium salt, ketoxime ether, an aminoalkylphenone compound, an aminoacetophenone compound, a hydroxyacetophenone compound, and the like. Among these, a hydroxyacetophenone compound is preferably used.

Examples of the halogenated hydrocarbon compound having a triazine skeleton include the compound described in Wakabayashi et al., Bull. Chem. Soc. Japan, 42, 2924 (1969), the compound described in UK1388492B, the compound described in JP1978-133428A (JP-H53-133428A), the compound described in DE3337024B, the compound described in F. C. Schaefer et al., J. Org. Chem, 29, 1527 (1964), the compound described in JP1987-58241A (JP-S62-58241A), the compound described in JP1993-281728A (JP-H05-281728A), the compound described in JP1993-34920A (JP-H05-34920A), the compound described in U.S. Pat. No. 4,212,976A, and the like.

Examples of polymerization initiators other than the above compounds include an acridine derivative (for example, 9-phenylacridine or 1,7-bis(9,9'-acridinyl) heptane), N-phenylglycine or the like, a polyhalogen compound (for example, carbon tetrabromide, phenyl tribromomethyl sulfone, or phenyl trichloromethyl ketone), coumarins (for example, 3-(2-benzofuranoyl)-7-diethylamino coumarin, 3-(2-benzofuroyl)-7-(1-pyrrolidinyl) coumarin, 3-benzoyl-7-diethylaminocoumarin, 3-(2-methoxybenzoyl)-7-diethylaminocoumarin, 3-(4-dimethylaminobenzoyl)-7-diethylaminocoumarin, 3,3'-carbonyl bis(5,7-di-n-propoxycoumarin), 3,3'-carbonylbis(7-diethylaminocoumarin), 3-benzoyl-7-methoxycoumarin, 3-(2-furoyl)-7-diethylaminocoumarin, 3-(4-diethylaminocinnamoyl)-7-diethylaminocoumarin, 7-methoxy-3-(3-pyridylcarbonyl) coumarin, 3-benzoyl-5,7-dipropoxy coumarin, 7-benzotriazol-2-lycoumarin, and the coumarin compounds described in JP1993-19475A (JP-H05-19475A), JP1995-271028A (JP-H07-271028A), JP2002-363206A, JP2002-363207A, JP2002-363208A, JP2002-363209A, and the like), acyl phosphine oxides (for example, bis(2,4,6-trimethylbenzoyl)-phenyl phosphine oxide, bis(2,6-dimethoxybenzoyl)-2,4,4-trimethyl-pentyl-phenyl phosphine oxide, or Lucirin TPO), metharocenes (for example, bis(η5-2,4-cyclopentadiene-1-yl)-bis(2,6-difluoro-3-(1H-pyrrol-1-yl)-phenyl) titanium, or η5-cyclopentadienyl-η6-cumenyl-iron(1+)-hexafluorophosphate(1−)), the compounds described in JP1978-133428A (JP-S53-133428A), JP1982-1819B (JP-S57-1819B), JP1982-6096B (JP-S57-6096B), U.S. Pat. No. 3,615,455A, and the like.

As the polymerization initiator, a hydroxyacetophenone compound, an aminoalkylphenone compound, an aminoacetophenone compound, and an acyl phosphine compound can also be preferably used. More specifically, for example, it is also possible to use the aminoacetophenone-based initiator described in JP1998-291969A (JP-H10-291969A) and the acyl phosphine oxide-based initiator described in JP4225898B.

As the hydroxyacetophenone-based initiator, it is possible to use IRGACURE-184, DAROCURE-1173, IRGACURE-500, IRGACURE-2959, and IRGACURE-127 (trade names, all manufactured by BASF). As the aminoalkylphenone-based initiator, it is possible to use IRGACURE-907, IRGACURE-369, and IRGACURE-379EG (trade names, all manufactured by BASF). As the aminoacetophenone-based initiator, it is possible to use IRGACURE-907, IRGACURE-369, and IRGACURE-379 (trade names, all manufactured by BASF) which are commercially available products. As the aminoacetophenone-based initiator, it is also possible to use the compound described in JP2009-191179A whose absorption wavelength is matched with a light source having a wavelength of 365 nm, 405 nm, or the like. Furthermore, as the acyl phosphine-based initiator, it is possible to use IRGACURE-819 or DAROCURE-TPO (trade names, all manufactured by BASF) which is a commercially available product.

As the polymerization initiator, an oxime-based compound can also be preferably used. Specific examples of the oxime-based initiator include the compounds described in JP2001-233842A, JP2000-80068A, and JP2006-342166A.

Examples of oxime ester compounds include the compounds described in J. C. S. Perkin II (1979), pp. 1653-1660, J. C. S. Perkin II (1979), pp. 156-162, Journal of Photopolymer Science and Technology (1995), pp. 202-232, and JP2000-66385A, the compounds described in JP2000-80068A, JP2004-534797A, and JP2006-342166A, and the like.

As commercially available products, IRGACURE-OXE01 (manufactured by BASF) and IRGACURE-OXE02 (manufactured by BASF) are also preferably used.

As oxime ester compounds other then the compounds described above, the compound described in JP2009-519904A in which oxime is linked to N-position of carbazole, the compound described in U.S. Pat. No. 7,626,957B in which a hetero substituent is introduced into a benzophenone site, the compound described in JP2010-15025A and US2009/292039A in which a nitro group is introduced into a colorant site, the ketoxime-based compound described in WO2009/131189A, the compound described in U.S. Pat. No. 7,556,910B containing a triazine skeleton and an oxime skeleton in the same molecule, the compound described in JP2009-221114A having maximal absorption at 405 nm and exhibiting excellent sensitivity with respect to a light source of g-line, and the like may also be used.

If necessary, the polymerization initiator used in the present invention may be used in combination of two or more kinds thereof The content of the polymerization initiator contained in the ink receiving layer (total content when the ink receiving layer contains two or more kinds of polymerization initiators) is preferably equal to or greater than 0.1% by mass and equal to or less than 50% by mass, more preferably equal to or greater than 0.5% by mass and equal to or less than 30% by mass, and even more preferably equal to or greater than 0.5% by mass and equal to or less than 20% by mass, with respect to the total solid content thereof. If the content is within the above range, excellent sensitivity is obtained.

In the present invention, from the viewpoint of the appropriate hardness and the adhesiveness, the content of the polymerization initiator contained in the ink receiving layer is particularly preferably equal to or greater than 2% by mass and equal to or less than 10% by mass.

(Others)

If necessary, the ink receiving layer may contain a surfactant, a resin, a cross-linking agent, a slip agent, an anti-foaming agent, a foam inhibitor, a dye, a fluorescent whitening agent, a preservative, an insolubilizer, particles, an organic solvent, distilled water, and the like, in addition to the polymerizable compound and the polymerization initiator.

From the viewpoint of improving the ink adhesiveness, it is preferable that the ink receiving layer contains a surfactant. From the viewpoint of further improving the ink adhesiveness, it is more preferable that the ink receiving layer contain a fluorine-based surfactant although there is no definite theory about what brings about the improvement.

In the present invention, the content of the surfactant contained in the ink receiving layer is preferably 0.01% by mass to 5% by mass, more preferably 0.05% by mass to 2% by mass, and particularly preferably 0.1% by mass to 1% by mass.

Examples of the surfactant include known anionic, nonionic, and cationic surfactants, a known fluorine-based surfactant, and a known silicone-based surfactant. The surfactant is described in, for example, "Surfactant Handbook" (Ichiro Nishi, Ichiro Imai, and Shozo Kasai, Sangyo Tosho Publishing Co., Ltd., 1960).

The fluorine-based surfactant is preferably used because it brings about an effect, particularly, an effect of improving the ink adhesiveness even added in an small amount. Furthermore, the fluorine-based surfactant brings about an effect of improving coating unevenness, drying unevenness, and planar defect such as point defect, and can increase the productivity by improving planar evenness with imparting high-speed coating suitability.

Preferred examples of the fluorine-based surfactant include a fluoroaliphatic group-containing copolymer (simply described as a "fluorine-based polymer" in some cases).

It is preferable that the fluorine-based polymer has a constitutional unit derived from fluorine-containing vinyl monomer and a constitutional unit for imparting cross-linking properties. Preferred examples of the constitutional unit of the fluorine-based polymer include the compounds described in paragraphs "0095" to "0102" of JP2011-75942A.

Preferred examples of the fluorine-based polymer include the compounds described in paragraphs "0049" to "0074" of JP2007-188070A and fluorine-based polymers FP-13, GF-1, GF-2, and GF-3 represented by the following structural formulae described in paragraph "0153" of JP2011-75942A.

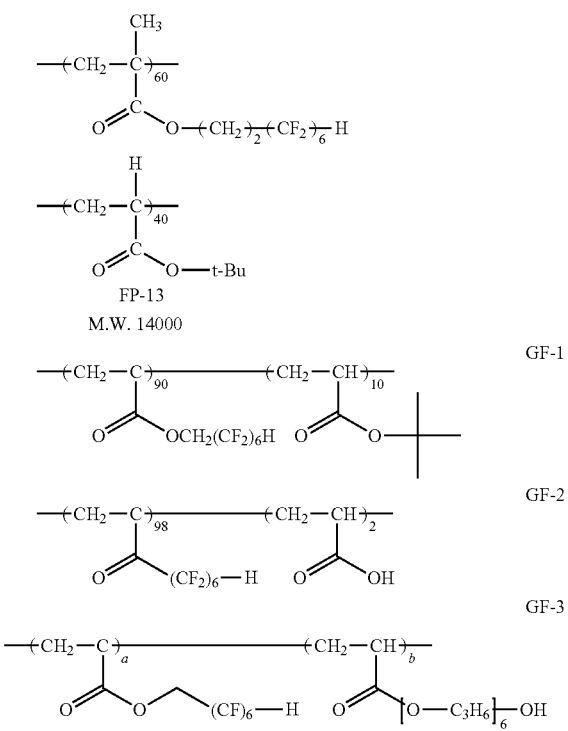

a/b=90/10 (% by mass)

In addition, a random copolymer of perfluoroolefin and vinyl ethers or vinyl esters is useful as the fluorine-based polymer. Particularly, it is preferable that the fluorine-based polymer has a group which can cause a cross-linking reaction alone {a radically polymerizable group such as a (meth)acryloyl group or a ring-opening polymerizable group such as an epoxy group or an oxetanyl group}. These polymerization units containing a group having cross-linking reactivity preferably account for 5 mol % to 70 mol % and particularly preferably account for 30 mol % to 60 mol % of the total polymerization units of the polymer. Preferred examples of the polymer include those described in JP2002-243907A, JP2002-372601A, JP2003-26732A, JP2003-222702A, JP2003-294911A, JP2003-329804A, JP2004-4444A, and JP2004-45462A.

For the purpose of imparting antifouling properties, a polysiloxane structure may be introduced into the fluorine-based polymer. The method for introducing the polysiloxane structure is not particularly limited, and for example, it is preferable to use a method of introducing a polysiloxane block copolymerization component by using a silicone macro-azo initiator as described in JP1994-93100A (JP-H06-93100A), JP1999-189621A (JP-H11-189621A), JP1999-228631A (JP-H11-228631A), and JP2000-313709A; or a method of introducing a polysiloxane graft copolymerization component by using a silicone macromer as described in JP1990-251555A (JP-H02-251555A) and JP1990-308806A (JP-H02-308806A). Examples Of particularly preferred compounds include the polymers of Examples 1, 2, and 3 of JP1999-189621A (JP-H11-189621A) or the copolymers A-2 and A-3 of JP1990-251555A (JP-H02-251555A). The amount of these polysiloxane components contained in the polymer is preferably 0.5% by mass to 10% by mass and particularly preferably 1% by mass to 5% by mass.

The molecular weight of the fluorine-based polymer which can be preferably used is preferably equal to or greater than 5,000, more preferably 10,000 to 500,000, and most preferably 15,000 to 200,000 in terms of the mass average molecular weight. If polymers having different average molecular weights are concurrently used, the form of the surface of the coating film or the scratch resistance can also be improved.

As described in JP1998-25388A (JP-H10-25388A) and JP2000-17028A, the aforementioned fluorine-based polymer may be used concurrently with a curing agent having a polymerizable unsaturated group as appropriate. Furthermore, as described in JP2002-145952A, the fluorine-based polymer may be used concurrently with a compound having a polyfunctional polymerizable unsaturated group containing fluorine. Particularly, it is preferable to concurrently use the fluorine-containing polymer as a main component together with the compound having a polymerizable unsaturated group, because the effect of improving the scratch resistance becomes strong in this case.

Examples of commercially available anionic surfactants include RAPISOL A-90, RAPISOL A-80, RAPISOL BW-30, RAPISOL B-90, and RAPISOL C-70 (trade names, manufactured by NOF CORPORATION), NIKKOL OTP-100 (trade name, manufactured by Nikko Chemicals Co., Ltd.), KOHACOOL ON, KOHACOOL L-40, and PHOSPHANOL 702 (TOHO Chemical Industry Co., Ltd.), BEAULIGHT A-5000 and BEAULIGHT SSS (Sanyo Chemical Industries, Ltd.), and the like.

Examples of commercially available nonionic surfactants include NAROACTY CL-95 and HN-100 (trade names, manufactured by Sanyo Chemical Industries, Ltd.), RISOREX BW400 (KOKYU ALCOHOL KOGYO CO., LTD.), EMALEX ET-2020 (NIHON EMULSION Co., Ltd.), UNILUB 50 MB-26 and NONION IS-4 (NOF CORPORATION), and the like.

Examples of commercially available fluorine-based surfactants include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, MEGAFACE F780, MEGAFACE F781, and MEGAFACE F784 (all manufactured by DIC Corporation), FLUORAD FC430, FLUORAD FC431, and FLUORAD FC171 (all manufactured by Sumitomo 3M, Ltd.), SURFLON S-382, SURFLON SC-101, SURFLON SC-103, SURFLON SC-104, SURFLON SC-105, SURFLON SC-1068, SURFLON SC-381, SURFLON SC-383, SURFLON S393, and SURFLON KH-40 (all manufactured by ASAHI GLASS CO., LTD.), PF636, PF656, PF6320, PF6520, and PF7002 (manufactured by OMNOVA Solutions Inc.), and the like.

Specific examples of commercially available cationic surfactants include a phthalocyanine derivative (trade name: EFKA-745, manufactured by MORISHITA & CO., LTD.), an organosiloxane polymer KP341 (manufactured by Shin-Etsu Chemical Co., Ltd.), (meth)acrylic acid-based (co) polymers POLYFLOW NO. 75, NO. 90, and NO. 95 (manufactured by KYOEISHA CHEMICAL Co., LTD.), W001 (manufactured by Yusho Co Ltd), and the like.

Examples of commercially available silicone-based surfactants include "TORAY SILICONE DC3PA", "TORAY SILICONE SH7PA", "TORAY SILICONE DC11PA", "TORAY SILICONE SH21PA", "TORAY SILICONE SH28PA", "TORAY SILICONE SH29PA", "TORAY SILICONE SH30PA", and "TORAY SILICONE SH8400" manufactured by Dow Corning Toray Co., Ltd., "TSF-4440", "TSF-4300", "TSF-4445", "TSF-4460", and "TSF-4452" manufactured by Momentive Performance Materials Inc., "KP341", "KF 6001", and "KF 6002" manufactured by Shin-Etsu Silicones, "BYK 307", "BYK 323", and "BYK 330" manufactured by BYK-Chemie GmbH, and the like.

One kind of the surfactant may be used singly, or two or more kinds thereof may be used in combination.

The ink receiving layer may contain a resin.

The function of the resin contained in the ink receiving layer is not particularly limited. Examples of the resin include a polyester-based resin, a polyurethane-based resin, or an acrylic resin which functions as a binder, a cellulose acylate resin which functions as a viscosity adjuster, and the like.

The resin contained in the ink receiving layer is preferably a cellulose acylate resin, and the ink receiving layer may contain two or more kinds of cellulose acylate resins. Examples of commercially available products thereof include cellulose acetate butyrate (CAB, manufactured by Eastman Chemical Japan Ltd.) and the like.

The amount of the resin contained in the ink receiving layer is preferably 0.1% by mass to 20% by mass, more preferably 1% by mass to 10% by mass, and particularly preferably 1% by mass to 5% by mass, with respect to the total solid content contained in the ink receiving layer. When the ink receiving layer contains two or more kinds of resins, the total amount of the resins should be within the above range.

The thickness of the ink receiving layer is, for example, preferably 0.1 µm to 50 µm, more preferably 1 µm to 40 µm, and particularly preferably 3 µm to 30 µm.

<Interlayer>

It is preferable that the inkjet recording sheet of the present invention has an interlayer constituted with a single layer or two or more layers, at least between the ink receiving layer and the transparent support or between the adhesive layer and the transparent support. Particularly, from the viewpoint of improving the adhesiveness between the ink receiving layer and the transparent support and improving the ink adhesiveness, it is preferable that the ink receiving layer has the interlayer at least between the ink receiving layer and the transparent support.

(Resin)

The composition of the interlayer is not particularly limited, but it is preferable that the interlayer contains at least a resin. The resin contained in the interlayer is not particularly limited, and known resins can be used. Particularly, it is preferable that the interlayer of the inkjet recording sheet of the present invention contains at least one kind of resin among a polyester-based resin, a polyurethane-based resin, an acrylic resin, and a polyolefin-based resin.

The interlayer may be constituted with a single layer or two or more layers. Hereinafter, the interlayer between the ink receiving layer and the transparent support will be described, but the preferred scope thereof is the same as the preferred scope of the interlayer between the adhesive layer and the transparent support. Specifically, the preferred scope of an interlayer A, which will be described later, preferable as the interlayer between the ink receiving layer and the transparent support is the same as the preferred scope of an interlayer D, which will be described later, preferable as the interlayer between the adhesive layer and the transparent support. Furthermore, the preferred scope of an interlayer B, which will be described later, preferable as the interlayer between the ink receiving layer and the transparent support is the same as the preferred scope of an interlayer E, which will be described later, preferable as the interlayer between the adhesive layer and the transparent support. In addition, the preferred scope of an interlayer C, which will be described later, preferable as the interlayer between the ink receiving layer and the transparent support is the same as the preferred scope of an interlayer F, which will be described later, preferable as the interlayer between the adhesive layer and the transparent support.

From the viewpoint of improving both the ink adhesiveness and the scratch resistance, it is preferable that the interlayer of the inkjet recording sheet of the present invention includes the interlayer A having a thickness of less than 0.1 µm. Particularly, when the interlayer between the ink receiving layer and the transparent support is constituted with a single layer, from the viewpoint of improving both the ink adhesiveness and the scratch resistance, it is preferable that the interlayer of the inkjet recording sheet of the present invention includes the interlayer A.

In a case where the interlayer is constituted with two or more layers, from the viewpoint of improving both the ink adhesiveness and the scratch resistance, it is also preferable that the interlayer of the inkjet recording sheet of the present invention includes the interlayer A. Furthermore, in a case where the interlayer A and another interlayer are combined with each other for the ink receiving layer, from the viewpoint of improving the ink adhesiveness, it is preferable that the inkjet recording sheet of the present invention has the interlayer A and the interlayer B in this order from the transparent support.

The composition of the interlayer A is not particularly limited. However, it is preferable that the interlayer A contains a polyester-based resin which will be described later, a polyurethane resin (preferably an isocyanate group-containing self-crosslinking polyurethane resin which is an isocyanate-based compound), a catalyst of a cross-linking agent, a surfactant (preferably an anionic surfactant), and fine particles.

From the viewpoint of improving the ink adhesiveness, at least one of the layers constituting the interlayer in the inkjet recording sheet of the present invention is preferably the interlayer B which has a thickness of equal to or greater than 0.1 µm and contains a polyolefin-based resin in a proportion of equal to or greater than 10%.

The modulus of elasticity of the interlayer B is preferably 500 MPa at most, that is, equal to or less than 500 MPa. The modulus of elasticity of the interlayer B is more preferably within a range of equal to or greater than 10 MPa and equal to or less than 500 MPa, and even more preferably within a range of equal to or greater than 50 MPa and equal to or less than 500 MPa. While the interlayer of the related art has a modulus of elasticity of equal to or greater than 600 MPa, the interlayer B has an extremely small modulus of elasticity as described above. Accordingly, when the transparent support or the ink receiving layer undergoes elastic deformation, the interlayer B expands or contracts at the extreme micro-level so as to follow the change in the shape of the transparent support or the ink receiving layer. For example, when the ink receiving layer is deformed in a direction approaching the transparent support as if the ink receiving layer is pressed on the transparent support, the interlayer B contracts to reduce the thickness thereof. Furthermore, when the deformed ink receiving layer returns to its original shape, the interlayer B also returns to its original thickness and shape. In this way, the interlayer B has a property of changing the thickness and reconstructing the shape. By imparting elasticity to the interlayer B, even if the shape of the ink receiving layer is changed, the ink receiving layer remains stuck to the transparent support without being peeled off and remains adhering to the transparent support. Herein, the peeling of the ink receiving layer from the transparent support means at least one of the peeling of the ink receiving layer from the interlayer B, the internal destruction of the interlayer B, and the peeling of the interlayer from the transparent support.

It is preferable that the interlayer B contains a polyolefin-based resin at least in an amount of 10% by mass. If the interlayer B contains the polyolefin-based resin in an amount of equal to or greater than 10% by mass, the modulus of elasticity of the interlayer B falls into the aforementioned range. The interlayer B contains the polyolefin-based resin preferably in an amount within a range of equal to or greater than 10% by mass and equal to or less than 90% by mass, and more preferably in an amount within a range of equal to or greater than 20% by mass and equal to or less than 80% by mass.

The composition of the interlayer B is not particularly limited as long as it contains the polyolefin-based resin in a proportion of equal to or greater than 10%. However, from the viewpoint of increasing the elongation at break of the interlayer by combining the interlayer with polyolefin, it is preferable that the interlayer B contains an acrylic resin. Examples of commercially available acrylic resins include AS-563A (manufactured by DAICEL FINECHEM LTD.) and the like. Furthermore, it is preferable that the interlayer B contains a cross-linking agent, a surfactant, and a preservative.

From the viewpoint of making it possible to improve the ink adhesiveness by facilitating the diffusion of the polymerization initiator and the polymerizable compound contained in the ink receiving layer, it is preferable that the interlayer of the inkjet recording sheet of the present invention is constituted with two or more layers, and at least one of the layers constituting the interlayer is the interlayer C containing at least one kind of resin between a polyester-based resin and a polyurethane-based resin. If used by being laminated on the interlayer B, the interlayer C can further improve the ink adhesiveness. Therefore, from the viewpoint of improving the ink adhesiveness, it is preferable that the inkjet recording sheet of the present invention has the interlayer B and the interlayer C in this order from the transparent support.

The composition of the interlayer C is not particularly limited as long as it contains at least one kind of resin between a polyester-based resin and a polyurethane-based resin. However, it is preferable that the interlayer C contains a cross-linking agent, a surfactant, a slip agent, and a preservative.

Hereinafter, the resin that can be preferably used in the interlayer will be described.

—Polyester Resin—

The interlayer may contain a polyester resin.

The polyester resin is a generic name of polymers having an ester bond on a main chain thereof, and generally obtained through a reaction between polycarboxylic acid and polyol. Examples of the polycarboxylic acid include fumaric acid, itaconic acid, adipic acid, sebacic acid, terephthalic acid, isophthalic acid, sulfoisophthalic acid, naphthalene dicarboxylic acid, and the like. Examples of the polyol include ethylene glycol, propylene glycol, glycerin, hexanetriol, butanediol, hexanediol, 1,4-cyclohexane dimethanol, and the like. The polyester resin and raw materials thereof are described in, for example, "Polyester Resin Handbook" (Eichiro Takiyama, NIKKAN KOGYO SHIMBUN, LTD., 1988), and the description can be applied to the present invention.

Examples of the polyester resin include a polyhydroxybutyrate (PHB)-based resin, a polycaprolactone (PCL)-based resin, a polycaprolactone butylene succinate-based resin, a polybutylene succinate (PBS)-based resin, a polybutylene succinate adipate (PBSA)-based resin, a polybutylene succinate carbonate-based resin, a polyethylene terephthalate succinate-based resin, a polybutylene adipate terephthalate-based resin, a polytetramethylene adipate terephthalate-based resin, a polybutylene adipate terephthalate-based resin, a polyethylene succinate (PES)-based resin, a polyglycolic acid (PGA)-based resin, a polylactic acid (PLA)-based resin, a polycarbonate copolymer of aliphatic polyester, a copolymer of aliphatic polyester and polyamide, and the like. The polyester resin can also be obtained as commercially available products such as FINETEX ES 650 and ES2200 (manufactured by DIC Corporation), VYLONAL MD1245, MD1400, and MD1480 (manufactured by TOYOBO CO., LTD.), PESRESIN A-110, A-124GP, A-520, and A-640 (manufactured by TAKAMATSU OIL & FAT CO., LTD.), and PLAS COAT Z561, Z730, Z687, and Z592 (manufactured by GOO CHEMICAL CO., LTD.).

—Polyurethane-Based Resin—

Polyurethane is a generic name of polymers having a urethane bond on a main chain thereof, and is generally obtained through a reaction between polyisocyanate and polyol. Examples of the polyisocyanate include toluene diisocyanate (TDI), diphenylmethane diisocyanate (MDI), naphthalene diisocyanate (NDI), tolidine diisocyanate (TODI), hexamethylene diisocyanate (HDI), isophorone isocyanate (IPDI), and the like. Examples of the polyol include ethylene glycol, propylene glycol, glycerin, hexanetriol, and the like. As isocyanate used in the present invention, it is possible to use a polymer whose molecular weight is increased by a chain elongation treatment performed on a polyurethane polymer obtained through a reaction between polyisocyanate and polyol. The polyisocyanate, the polyol, and the chain elongation treatment are described in, for example, "Polurethane Handbook" (Keiji Iwata, NIKKAN KOGYO SHIMBUN, LTD., 1987). The polyurethane resin can be obtained as commercially available products such as SUPERFLEX 470, 210, and 150 HS, and ELASTRON H-3 (manufactured by DAI-ICHI KOGYO SEIYAKU CO., LTD.), HYDRAN AP-20, AP-40F, and WLS-210 (manufactured by DIC Corporation), and TAKELAC W-6061 and OLESTER UD-350 (manufactured by Mitsui Chemicals, Inc.).

—Acrylic Resin—

It is preferable that the interlayer contains an acrylic resin. If used in combination with polyolefin in the same interlayer, the acrylic resin can increase the elongation at break of the interlayer.

The acrylic resin is a polymer composed of a polymerizable monomer having a carbon-carbon double bond that is represented by an acrylic monomer or a methacrylic monomer. The polymer may be a homopolymer or a copolymer. The polymer also includes a copolymer of the above polymers and other polymers (for example, polyester and polyurethane). For example, the copolymer may be a block copolymer or a graft copolymer. Alternatively, the polymer includes a polymer (a polymer mixture in some cases) which is obtained by polymerizing a polymerizable monomer having a carbon-carbon double bond in a polyester solution or in a polyester dispersion liquid. In addition, the polymer also includes a polymer (a polymer mixture in some cases) which is obtained by polymerizing a polymerizable monomer having a carbon-carbon double bond in a polyurethane solution or in a polyurethane dispersion liquid. Furthermore, the polymer also includes a polymer (a polymer mixture in some cases) which is obtained by polymerizing a polymerizable monomer having a carbon-carbon double bond in a solution or dispersion liquid of other polymers. In order to further improve the adhesiveness, the polymer can contain a hydroxyl group or an amino group. The polymerizable monomer having a carbon-carbon double bond is not particularly limited. Examples of particularly typical compounds thereof include various carboxyl group-containing monomers and a salt thereof, such as acrylic acid, methacrylic acid, crotonic acid, itaconic acid, fumaric acid, maleic acid, and citraconic acid; various hydroxyl group-containing monomers such as 2-hydroxyethyl (meth)acrylate, 2-hydroxypropyl (meth)acrylate, 4-hydroxybutyl (meth)acrylate, monobutyl hydroxylfumarate, and monobutyl hydroxyitaconate; various (meth)acrylic acid esters such as methyl (meth)acrylate, ethyl (meth)acrylate, propyl (meth)acrylate, butyl (meth)acrylate, and lauryl (meth)acrylate; various nitrogen-containing compounds such as (meth) acrylamide, diacetoneacrylamide, N-methylolacrylamide and (meth)acrylonitrile; various styrene derivatives such as styrene, a-methyl styrene, divinylbenzene, and vinyl toluene; various vinyl esters such as vinyl propionate; various silicon-containing polymerizable monomers such as γ-methacryloxypropyl trimethoxysilane, and vinyl trimethoxysilane; phosphorus-containing vinyl-based monomers; various vinyl halides such as vinyl chloride and vinylidene chloride; and various conjugated dienes such as butadiene. As the acrylic acid ester copolymer, a commercially available product such as JURYMER ET-410 (manufactured by TOAGOSEI CO., LTD.) or EM-48D (manufactured by DAICEL CORPORATION) is preferably used.

When the acrylic resin is concurrently used with polyolefin in a single interlayer, the proportion of mass of the acrylic resin to the polyolefin is preferably within a range of equal to or greater than 0% and equal to or less than 700%, more preferably within a range of equal to or greater than 5% and equal to or less than 700%, and even more preferably within a range of equal to or greater than 30% and equal to or less than 300%.

—Polyolefin-Based Resin—

The polyolefin-based resin is generally known to exhibit weak adhesion with respect to polyester. In the related art, the polyolefin-based resin has not been used as a main component in the interlayer for sticking the ink receiving layer composed of polyester to the transparent support.

Furthermore, the polyolefin-based resin has been used in the interlayer only when polyolefin is used in the transparent support or the ink receiving layer.

In the present invention, it is preferable to use polyolefin in the interlayer B between the transparent support and the ink receiving layer. In order to prevent the ink receiving layer from being peeled from the transparent support even when the polyolefin is used as a main component of the interlayer B, it is preferable that a thickness T of the interlayer B is at least 0.1 μm, that is, equal to or greater than 0.1 μm. If the thickness of the interlayer is equal to or greater than 0.1 μm, the ink receiving layer is not easily peeled from the support, particularly in a high-density print portion to which a large amount of ink is ejected. Furthermore, if the thickness of the interlayer is set as described above, for example, the stress, which is applied as a load to the ink receiving layer or the transparent support due to a cross cutter at the time of a cross cut test, is relaxed in the interlayer B. The thickness T of the interlayer B is preferably within a range of greater than 0.1 μm and equal to or less than 5.0 μm, more preferably within a range of equal to or greater than 0.3 μm and equal to or less than 5.0 μm, and even more preferably within a range of greater than 0.2 μm and equal to or less than 4.0 μm. It is preferable that the thickness T of the interlayer B is constant.

If the inkjet recording sheet of the present invention has the interlayer B, the stress is dispersed. Therefore, even if the ink receiving layer is not sufficiently dyed with the ink composition, the ink adhesiveness can be improved.

If the resin which does not easily deteriorate at a high temperature and a high humidity is used, even when the interlayer is evaluated as in the related art by being left in a moist and hot environment (for example, by being left for 100 hours to 500 hours while being dried at 85° C. or 65° C. at a relative humidity of 95%), the modulus of elasticity and the elongation at break thereof are maintained as described above. The polyolefin-based resin is a resin that does not easily deteriorate at a high temperature and a high humidity. Therefore, if the polyolefin-based resin is used, even when the interlayer is left in a moist and hot environment, the modulus of elasticity and the elongation at break of the interlayer can be maintained as described above.

The polyolefin is a polymer obtained by polymerizing alkene such as ethylene, butylene, or propylene, and may be a copolymer having the corresponding structure. Hereinafter, the polymer and the copolymer will be collectively called a polyolefin-based polymer. Specifically, the polyolefin-based polymer is preferably any of the following copolymers.

Copolymer composed of ethylene or polypropylene and an acryl monomer or a methacryl monomer Copolymer composed of ethylene or polypropylene and carboxylic acid (including anhydride)

Copolymer composed of ethylene or polypropylene, an acryl monomer or a methacryl monomer, and carboxylic acid (including anhydride)

Preferred examples of the acryl monomer or the methacryl monomer constituting the polyolefin-based polymer specifically include methyl methacrylate, ethyl acrylate, butyl acrylate, 2-hydroxyethyl acrylate, and the like.

Preferred examples of the carboxylic acid constituting the polyolefin-based polymer include acrylic acid, methacrylic acid, itaconic acid, maleic acid, maleic anhydride, and the like. One kind of these carboxylic acids may be used singly, or two or more kinds thereof may be used by being mixed together.

The total amount of ethylene or polypropylene in the polyolefin-based polymer is within a range of 80 mol % to 98 mol %, and preferably within a range of 85 mol % to 95 mol %. Furthermore, the total amount of the acryl monomer or the methacryl monomer is within a range of 0 mol % to 20 mol %, and preferably within a range of 3 mol % to 10 mol %. In addition, the total amount of the carboxylic acid is within a range of 0 mol % to 15 mol %, and preferably within a range of 1 mol % to 10 mol %. If the monomers are composed within the above range, excellent adhesiveness and durability can be achieved at the same time.

The molecular weight of the polyolefin-based polymer is preferably about 2,000 to 200,000. The polyolefin-based polymer may have a linear structure or a branched structure. It is preferable that the polyolefin-based polymer is in the form of an aqueous polymer dispersion (so-called latex). Examples of the method for manufacturing the aqueous polymer dispersion of the polyolefin-based polymer include an emulsification method and an emulsification/dispersion method, and the emulsification method is preferable. As the specific method thereof, for example, the method described in JP3699935B can be referred to.

When the polyolefin-based polymer is in the form of latex of an aqueous polymer, it is preferable that the polyolefin-based polymer has a functional group having affinity with water, such as a carboxyl group or a hydroxyl group. Furthermore, when the polyolefin-based polymer is used in the form of latex, in order to improve the stability, a surfactant (example: anionic or nonionic surfactant) or an emulsion stabilizer such as a polymer (example: polyvinyl alcohol) may be added thereto. In addition, if necessary, compounds known as additives for latex, such as a pH adjuster (example: ammonia, triethylamine, or sodium hydrogen carbonate), a preservative (example: 1,3,5-hexahydro-(2-hydroxyethyl)-s-triazine or 2-(4-thiazolyl)benzimidazole), a thickener (example: sodium polyacrylate or methyl cellulose), and a film formation assistant (example: butyl carbitol acetate), may be added thereto.

The aqueous latex of the polyolefin-based polymer which can be used in the present invention is commercially available. Specific examples of the commercially available product include BONDINE HX-8210, HX-8290, TL-8030, and LX-4110 (all manufactured by SUMITOMO CHEMICAL Co., Ltd.), ARROW BASE SA-1200, SB-1010, SE-1013N, and SE-1200 (all manufactured by UNITIKA, LTD.), NIPPOL UFN 1008 (manufactured by ZEON CORPORATION), and the like.

(Cross-Linking Agent)

It is preferable that the interlayer contains a cross-linking agent. The cross-linking agent is used to further improve the adhesion between the ink receiving layer and the support. The cross-linking agent should cause a cross-linking reaction at the time of forming the interlayer, and may not remain in the formed interlayer. That is, in the obtained inkjet recording sheet of the present invention, the cross-linking agent may be incorporated into a portion of a cross-linked structure composed of other molecules cross-linked by the cross-linking agent, as a cross-linking agent that has accomplished the reaction or action thereof. Due to the cross-linking agent, the number of cross-linking points between molecules or in molecules in the interlayer is increased. Consequently, the shape reconstructing properties of the intermediate becomes more reliable, and the adhesion between the interlayer and the ink receiving layer as well as the support is further improved.

As the cross-linking agent contained in the interlayer, an oxazoline-based compound, a carbodiimide-based compound, an epoxy-based compound, an isocyanate-based compound, and a melamine-based compound ($C_3N_6H_6$) are preferable. A plural kinds of these may be contained in the interlayer. As the cross-linking agent, an oxazoline-based compound and a carbodiimide-based compound are particularly preferable. Examples of commercially available products thereof include CARBODILITE V-02-L2 (manufactured by Nisshinbo Chemical Inc.), EPOCROS K-2020E (manufactured by NIPPON SHOKUBAI CO., LTD.), and the like. As the carbodiimide-based compound and the oxazoline-based compound, the same compounds as the cross-linking agent contained in the ink receiving layer can be used, and the preferred scope thereof is also the same. The details of the epoxy-based compound, the isocyanate-based compound, and the melamin-based compound will be described later.

The amount of the cross-linking agent added to the interlayer is preferably 1% by mass to 50% by mass, more preferably 3% by mass to 30% by mass, and even more preferably 5% by mass to 25% by mass.

If the amount of the cross-linking agent added is less than 1% by mass, the polyolefin-based resin insufficiently cross-linked in some cases. From the viewpoint of the adhesion, if the amount of the cross-linking agent added is greater than 50% by mass, the cost is increased too much even though the interlayer is not negatively affected.

—Epoxy-Based Compound—

The epoxy-based compound is a compound which has an epoxy group in a molecule and is obtained as a result of the reaction of the epoxy group. Examples of the compound having an epoxy group in a molecule include a condensate of with a hydroxyl group or an amino group, such as epichlorohydrin, ethylene glycol, polyethylene glycol, glycerin, polyglycerin, or bisphenol A. The compound having an epoxy group in a molecule include a polyepoxy compound, a diepoxy compound, a monoepoxy compound, a glycidyl amine compound, and the like. Examples of the polyepoxy compound include sorbitol, polyglycidyl ether, polyglycerol polyglycidyl ether, pentaerythritol polyglycidyl ether, diglycerol polyglycidyl ether, triglycidyl tris(2-hydroxyethyl) isocyanate, glycerol polyglycidyl ether, and trimethylolpropane polyglycidyl ether. Examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, and polytetramethylene glycol diglycidyl ether. Examples of the monoepoxy compound include allylglycidylether, 2-ethylhexyl glycidyl ether, and phenylglycidylether. Examples of the glycidyl amine compound include N,N,N',N'-tetraglycidyl-m-xylylenediamine, 1,3-bis(N,N-diglycidylamino) cyclohexane, and the like. Specific examples of commercially available water-soluble monomers having an epoxy group include "DENACOL 614B" (sorbitol polyglycidyl ether, epoxy equivalent of 173, trade name, manufactured by Nagase ChemteX Corporation), "DENACOL EX-313" (glycerol polyglycidyl ether, epoxy equivalent of 141, trade name, manufactured by Nagase ChemteX Corporation), "DENACOL EX-521" (polyglycerol polyglycidyl ether, epoxy equivalent of 168, trade name, manufactured by Nagase ChemteX Corporation), and "DENACOL EX-830" (polyethylene glycol diglycidyl ether, epoxy equivalent of 268, trade name, manufactured by Nagase ChemteX Corporation).

—Isocyanate-Based Compound—

The isocyanate-based compound is a compound having a partial structure of —N=C=O. Examples of organic isocyanate-based compounds include aromatic isocyanate, aliphatic isocyanate, and an isocyanate group-containing resin, and these may be used by being mixed together. Specifically, 4,4'-diphenylmethane diisocyanate, 4,4-diphenyl dimethyl methane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethyl hexamethylene diisocyanate, 4,4'-dicyclohexylmethane diisocyanate, 1,3-phenylene diisocyanate, and the like are used. As organic monoisocyanate, isophorone isocyanate, phenyl isocyanate, cyclohexyl isocyanate, butyl isocyanate, naphthyl isocyanate, and the like are used. Examples of the isocyanate group-containing resin include a self-crosslinking polyurethane resin containing an isocyanate group. The isocyanate-based compound can be obtained as, for example, ELASTRON H-3 (manufactured by DAI-ICHI KOGYO SEIYAKU CO., LTD.), DP9C214 (manufactured by Baxenden Chemicals Ltd.), or TAKENATE XWD-HS30 (manufactured by Mitsui Chemicals, Inc.).

—Melamine-Based Compound—

The melamine-based compound is a compound having two or more methylol groups in a molecule. In the present embodiment, the melamine-based compound can be used without particular limitation. Examples of the melamine-based compound include hexamethylol melamine. Examples of commercially available melamine-based compounds include BECKAMINE PM-N, BECKAMINE J-101, and BECKAMINE M-3 (manufactured by DIC Corporation).

(Others)

If necessary, the interlayer may contain a surfactant, an anti-foaming agent, a foam inhibitor, a dye, a fluorescent whitening agent, a preservative, an insolubilizer, an antistatic agent, a catalyst of a cross-linking agent, and the like, in addition to the resin and the cross-linking agent. Examples of the catalyst of the cross-linking agent include a catalyst for ELASTRON (trade name: Cat 64 manufactured by DAI-ICHI KOGYO SEIYAKU CO., LTD.) and the like.

As the surfactant, those exemplified above as the surfactant of the ink receiving layer can be used, and the preferred scope thereof is also the same.

As the slip agent, aliphatic wax or the like is preferably used.

Specific examples of the aliphatic wax include vegetable wax such as carnauba wax, candelilla wax, rice wax, japan wax, jojoba oil, palm wax, rosin-modified wax, ouricury wax, sugar cane wax, esparto wax, and bark wax, animal wax such as beeswax, lanolin, spermaceti, insect wax, and shellac wax, mineral wax such as montan wax, ozokerite, and ceresin wax, petroleum-based wax such as paraffin wax, microcrystalline wax, and petrolatum, synthetic hydrocarbon-based wax such as Fischer-Tropsch wax, polyethylene wax, oxidized polyethylene wax, polypropylene wax, and oxidized polypropylene wax, and the like. Among these, carnauba wax, paraffin wax, and polyethylene wax are particularly preferable. It is preferable that these waxes are used in the form of an aqueous dispersion because then the environmental load can be reduced and the handling of the waxes becomes easy. Examples of commercially available products thereof include CELLOSOLVE 524 (manufactured by CHUKYO YUSHI CO., LTD.) and the like.

One kind of slip agent may be used singly, or two or more kinds thereof may be used in combination.

As the particles, any of organic and inorganic fine particles can be used. For example, it is possible to use fine particles of a polymer such as polystyrene, polymethyl methacrylate (PMMA), a silicone resin, or a benzoguanamine resin or inorganic fine particles of silica, calcium carbonate, magnesium oxide, or magnesium carbonate. Examples of commercially available products thereof include cross-linked PMMA particles MR-2G (manufactured by Soken Chemical & Engineering Co., Ltd.), silica particles SEAHOSTAR KE-W10 (manufactured by NIPPON SHOKUBAI CO., LTD.), SNOWTEX XL (manufactured by NISSAN CHEMICAL INDUSTRIES, LTD), and the like.

One kind of particles may be used singly, or two or more kinds thereof may be used in combination.

Examples of the preservative include sodium dehydroacetate, sodium benzoate, sodium pyridinethione-1-oxide, ethyl p-hydroxy benzoic acid ester, 1,2-benzothiazolin-3-one, sodium sorbate, pentachlorophenol sodium, and the like.

<Adhesive Layer>

The adhesive used in the adhesive layer is not particularly limited as long as it sticks two substances to each other by means of adhesion action. As the adhesive layer, those described in paragraphs "0069" to "0074" of JP2010-115818A can be used. As the adhesive, a rubber-based adhesive, a vinyl polymerization-based adhesive, a condensation polymerization-based adhesive, a thermosetting resin-based adhesive, a silicone-based adhesive, and the like can be used. Examples of the rubber-based adhesive include a butadiene-styrene copolymer-based adhesive (SBR), a butadiene-acrylonitrile copolymer-based adhesive (NBR), a chloroprene polymer-based adhesive, an isobutyrene-isoprene copolymer-based adhesive (butyl rubber), and the like.

Examples of the vinyl polymerization-based adhesive include an acrylic adhesive, a styrene-based adhesive, a vinyl acetate-ethylene copolymer-based adhesive, a vinyl chloride-vinyl acetate copolymer-based adhesive, and the like. Examples of the condensation polymerization-based adhesive include a polyester-based adhesive. Examples of the thermosetting resin-based adhesive include an epoxy resin-based adhesive, a urethane resin-based adhesive, a formalin resin-based adhesive, and the like. Considering excellent transparency, weather resistance, heat resistance, moist heat resistance, substrate adhesiveness, and the like, an acrylic adhesive is preferably used among the above adhesives. Specific examples of the acrylic adhesive include SK DYNE (registered trademark) 1310 and 1435, SK DYNE 1811L, SK DYNE 1888, SK DYNE 2094, SK DYNE 2096, SK DYNE 2137, SK DYNE 3096, and SK DYNE 1852 manufactured by Soken Chemical & Engineering Co., Ltd., BPS5961, BPS4622, BPS4849-40, BPS6130TF, BPS6078TF, EG354J, BPS5296, and BP S5963 manufactured by TOYOCHEM CO., LTD., and the like.

When used alone, the acrylic adhesive has weak cohesive force. Therefore, it is preferable that the acrylic adhesive is cross-linked by a cross-linking agent. As the cross-linking agent, an isocyanate compound, an epoxy compound, an aziridine compound, a metal chelate compound, and the like are preferably used.

In the acrylic adhesive, a curing accelerator (for example, BXX 3778-10 or BXX 4805 manufactured by TOYOCHEM CO., LTD.), a curing retarder (for example, BXX 5638 manufactured by TOYOCHEM CO., LTD.), a curing agent (for example, BXX 6269 manufactured by TOYOCHEM CO., LTD.), and other additives (BXX 6342 or the like manufactured by TOYOCHEM CO., LTD.) are preferably used.

Furthermore, according to the material of the adherend (glass), it is preferable that a coloring pigment or a coloring dye, an antioxidant, an ultraviolet absorber, a silane coupling agent, a metal deactivator, and the like are appropriately added to and formulated with the acrylic adhesive.

The film thickness of the adhesive layer after drying is preferably 1 µm to 50 µm, and more preferably 5 µm to 30 µm.

<Release Film>

Considering workability, it is preferable that the inkjet recording sheet of the present invention has a release film on the adhesive layer. When a printed article using the inkjet recording sheet of the present invention is stuck to glass, by peeling the release film from the adhesive layer and sticking the adhesive layer to the glass, ornamental glass can be obtained.

As the release film, a film obtained by coating a film substrate such as polyester with a release agent such as silicone is preferably used. Specific examples of such a release film include "CERAPEEL (registered trademark) WZ", "CERAPEEL BKE", and "CERAPEEL BX8A" manufactured by TORAY ADVANCED FILM Co., Ltd., and the like.

[Method for Manufacturing Inkjet Recording Sheet]

The method for manufacturing an inkjet recording sheet of the present invention includes a step of forming an ink receiving layer on one surface of a transparent support. The step of forming an ink receiving layer is a step of curing a composition containing at least a polymerization initiator and a polymerizable compound.

<Step of Forming Ink Receiving Layer>

First, the step of forming an ink receiving layer will be described.

The step of forming an ink receiving layer of an inkjet recording sheet of the present invention is not particularly limited as long as the step includes a step of curing a composition containing at least a polymerization initiator and a polymerizable compound. For example, by coating one surface of a transparent support or coating the surface of an interlayer disposed on one surface of the transparent support with a composition containing a polymerization initiator and a polymerizable compound for forming an ink receiving layer, drying the composition if necessary, and then curing the composition containing a polymerization initiator and a polymerizable compound, an ink receiving layer can be formed. If necessary, other steps may be additionally performed.

The coating can be performed by using, for example, a blade coater, an air knife coater, a roll coater, a bar coater, a gravure coater, or a reverse coater. When the coating is performed by a simultaneous multilayer coating method in which coating is performed by using a plurality of coating solutions without carrying out a drying step, the coating is conducted by using, for example, a slide bead coater, a slide curtain coater, a curtain roll coater, or an extrusion die coater. Furthermore, for example, the coating may be performed by the "Wet-On-Wet method" (WOW method) described in paragraphs "0016" to "0037" of JP2005-14593A.

The amount of the composition, which contains a polymerization initiator and a polymerizable compound used for forming an ink receiving layer, coating the transparent support is preferably 5 g/m$^2$ to 20 g/m$^2$, and more preferably 7 g/m$^2$ to 10 g/m$^2$.

The step of curing the composition containing at least a polymerization initiator and a polymerizable compound is not particularly limited. In this step, the composition may be cured by photopolymerization, thermal polymerization, or a combination of photopolymerization and thermal polymerization. However, from the viewpoint of accomplishing both the scratch resistance and the ink adhesiveness, it is preferable that the composition is cured by photopolymerization.

In the method for manufacturing an inkjet recording sheet of the present invention, the polymerization initiator is preferably a photopolymerization initiator, and the step of curing the composition is preferably a photosensitive curing step in which the composition is irradiated with ultraviolet rays.

In the method for manufacturing an inkjet recording sheet of the present invention, from the viewpoint of lowering the curing rate such that a polymerizable group remains in the polymerizable compound in the ink receiving layer and thus the ink adhesiveness becomes excellent, the irradiation amount of the ultraviolet rays in the photosensitive curing step is preferably 10 mJ/cm$^2$ to 200 mJ/cm$^2$, more preferably 30 mJ/cm$^2$ to 150 mJ/cm$^2$, and particularly preferably 50 mJ/cm$^2$ to 100 mJ/cm$^2$.

<Step of Forming Interlayer>

In the method for manufacturing an inkjet recording sheet of the present invention, the step of forming an interlayer is not particularly limited, and a known method can be used. For example, the interlayer can be preferably prepared by a manufacturing method including a step of coating at least one surface of the transparent support with a coating solution for forming a single interlayer or two or more interlayers in a manner of sequential coating or simultaneous multilayer coating and drying the coating solution so as to form a single interlayer or two or more interlayers. If necessary, other steps may be additionally performed.

The interlayer formed between the ink receiving layer and the transparent support and the interlayer formed between the adhesive layer and the transparent support may be simultaneously formed. Specifically, it is preferable that both surfaces of the transparent support are simultaneously coated with the coating solution for forming an interlayer, and the coating solution is then dried.

The method for manufacturing an inkjet recording sheet of the present invention preferably includes a first stretching step of stretching a film for a transparent support in a film transport direction or in a direction orthogonal to the film transport direction, a step of coating at least one surface of the film for a transparent support having undergone the first stretching step with the coating solution for forming an interlayer, and a second stretching step of stretching the film for a transparent support coated with the coating solution for forming an interlayer in a direction orthogonal to the stretching direction in the first stretching step so as to form a transparent support and an interlayer having a thickness of less than 0.1 p.m.

By adopting the above constitution, it is possible to manufacture an inkjet recording sheet in which the interlayer includes an interlayer A having a thickness of less than 0.1 μm.

The first stretching step is preferably a step of stretching the film in the film transport direction, and the second stretching step is preferably a step of stretching the film in a direction orthogonal to the film transport direction.

When the interlayer A is formed as described above, the stretching ratio in the first stretching step and the second stretching step is not particularly limited, and the preferred range of the stretching ratio in each step is the same as the range described above as the preferred range of the stretching ratio of the transparent support.

The amount of the coating solution, which is used for forming the interlayer, coating the film for a transparent support is preferably 5 g/m$^2$ to 20 g/m$^2$, and more preferably 7 g/m$^2$ to 10 g/m$^2$.

<Step of Forming Adhesive Layer>

The step of forming an adhesive layer is not particularly limited, and a known method can be used. For example, the adhesive layer can be preferably prepared by a manufacturing method including a step of forming an adhesive layer by coating one surface of the transparent support with a coating solution for forming an adhesive layer and drying the coating solution. If necessary, other steps may be additionally performed.

The method for preparing the coating solution for forming an adhesive layer is not particularly limited. The coating solution can be prepared by mixing a main agent of an adhesive, a solvent, additives, a curing accelerator, a curing retarder, and the like together, and then mixing the resultant with a curing agent.

As the coating and drying methods for forming the adhesive layer, the same methods as the coating and drying methods for forming the interlayer can be used. It is preferable that the adhesive layer is formed by coating the transparent support with the coating solution for forming an adhesive layer by means of a wire bar coating method and drying the coating solution in an oven.

The concentration of solid content in the coating solution for forming an adhesive layer is preferably 5% by mass to 40% by mass, and more preferably 10% by mass to 20% by mass.

The amount of the coating solution for forming an adhesive layer that coats the transparent support is preferably 5 g/m$^2$ to 500 g/m$^2$, and more preferably 50 g/m$^2$ to 250 g/m$^2$.

After the transparent support is directly coated or coated through another layer, in order to dry the solvent, the adhesive layer is preferably held in a heated oven. The drying time is preferably, for example, 1 minute to 10 minutes.

The temperature of the oven is preferably 80° C. to 140° C. Here, the temperature of the oven is preferably equal to or lower than a temperature at which components other than the solvent contained in the coating composition of the adhesive layer start to volatilize.

<Step of Forming Release Film>

The step of forming a release film is not particularly limited, and a known method can be used. It is preferable that a release film is laminated on the adhesive layer and stuck to the adhesive layer by being pressed by a roller.

[Method for Manufacturing Printed Article]

The method for manufacturing a printed article of the present invention includes a step of ejecting an ink composition onto the inkjet recording sheet of the present invention from an ink jet recording device, and a step of curing the ejected ink composition by irradiating the ink composition with ultraviolet rays.

The ink composition used in the present invention is not particularly limited as long as it is a known ink composition. However, the ink composition is preferably a radiation curable type ink composition, and particularly preferably a radiation curable type solventless ink composition not containing a solvent because the composition is cured after being ejected onto the inkjet recording sheet of the present invention.

The radiation is not particularly limited as long as it can provide energy which can generate an initiation species in the ink composition through the irradiation thereof, and includes a wide variety of radiations such as α rays, γ rays, X rays, ultraviolet rays, visible rays, and electron beams. Among these, from the viewpoint of the curing sensitivity and the ease of availability of the device, ultraviolet rays and electron beams are preferable, and ultraviolet rays are particularly preferable. Accordingly, in the present invention, an ultraviolet curable type ink composition is preferable.

Regarding the radiation curable type ink composition, for example, those described in JP2010-47015A and JP1993-214280A (JP-H05-214280A) can be referred to, and the contents of the documents are incorporated into the specification of the present application.

Regarding the radiation curable type solventless ink composition, for example, those described in JP2004-131725A and JP2009-299057A can be referred to, and the contents of the documents are incorporated into the specification of the present application.

Figure 4:
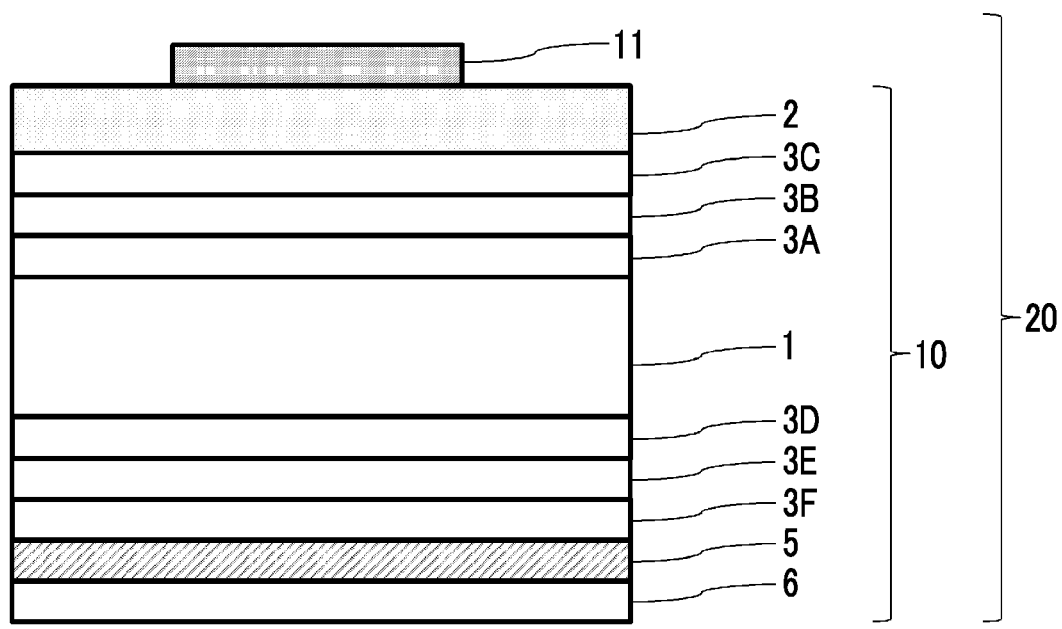
FIG. 4 is a schematic cross-sectional view of an example of a printed article of the present invention.

The method for manufacturing a printed article of the present invention includes the aforementioned step. As a result, an image portion is formed on the inkjet recording sheet by the cured ink composition, and a printed article illustrated in FIG. 4 is formed.

Examples of the inkjet recording device which can be used in the present invention include a device including an ink supply system, a temperature sensor, and an active radiation source.

The ink supply system is composed of, for example, a base tank containing the ink composition of the present invention, supply piping, an ink supply tank immediately before an inkjet head, a filter, and a piezo-type inkjet head. The piezo-type inkjet head can be driven such that it can eject multi-sized dots preferably having a size of 1 pl to 100 pl and more preferably having a size of 8 pl to 30 pl, preferably at a resolution of 320×320 dpi to 4,000×4,000 dpi, more preferably at a resolution of 400×400 dpi to 1,600×1,600 dpi, and even more preferably at a resolution of 720×720 dpi. Herein, dpi mentioned in the present invention represents the number of dots per 2.54 cm.

It is desirable that an ink such as a radiation curable type ink is kept at a constant temperature when being ejected. Therefore, it is preferable that the inkjet recording device includes means for stabilizing the temperature of the ink composition. The site to be kept at a constant temperature includes a piping system from an ink tank (intermediate tank when the device has an intermediate tank) to the ejection surface of a nozzle and all members. That is, the area from the ink supply tank to the portion of the inkjet head can be insulated and heated.

The temperature control method is not particularly limited. However, for example, it is preferable to provide a plurality of temperature sensors to the respective piping portions so as to control heating according to the flow rate of the ink and the environmental temperature. The temperature sensor can be provided in the ink supply tank and in the vicinity of the nozzle of the inkjet head. Moreover, it is preferable that the head unit to be heated is a heat-blocking unit or is thermally insulated, such that the body of the device is not influenced by the temperature of external air. In order to shorten printer startup time taken for heating or to reduce thermal energy loss, it is preferable to insulate the heating unit from other sites and to reduce a total thermal capacity of the heating unit.

It is preferable that the ink composition is ejected by using the inkjet recording device described above, after the ink composition is heated preferably to 25° C. to 80° C. and more preferably to 25° C. to 50° C. and the viscosity of the ink composition is reduced preferably into 3 mPa·s to 15 mPa·s and more preferably into 3 mPa·s to 13 mPa·s. In the present invention, it is particularly preferable to use an ink composition having ink viscosity of equal to or less than 50 mPa·s at 25° C., because such an ink composition can be excellently ejected. If the aforementioned method is used, high ejection stability can be realized.

Usually, the viscosity of the radiation curable type ink composition is higher than the viscosity of an aqueous ink that is generally used as an ink for inkjet recording. Accordingly, the viscosity of the ink composition greatly varies with the temperature at the time of ejection. The variation in the viscosity of the ink composition exerts a great influence on the change in the liquid droplet size and on the change in the ejection rate of the liquid droplets, and results in the deterioration of image quality. Therefore, it is important for the temperature of the ink composition at the time of ejection to be kept as constant as possible. Consequently, in the present invention, it is appropriate for the temperature of the ink composition to be controlled preferably within a range of a set temperature±5° C., more preferably within a range of a set temperature±2° C., and even more preferably within a range of a set temperature±1° C.

Next, the step of curing the ejected ink composition by irradiating the ink composition with radiation will be described.

The ink composition ejected onto the inkjet recording sheet of the present invention is cured by being irradiated with radiation. This is because the radical polymerization initiator contained in the ink composition is decomposed by being irradiated with the radiation and thus generates radicals, and the radicals cause and accelerate a polymerization reaction of a radically polymerizable compound. At this time, if both the radical polymerization initiator and the sensitizer are present in the ink composition, the sensitizer in the system is excited by absorbing the radiation and comes into contact with the radical polymerization initiator. As a result, decomposition of the radical polymerization initiator is accelerated, and thus a curing reaction with higher sensitivity can occur.

The peak wavelength of the radiation used depends on the absorption characteristics of the sensitizer. However, the peak wavelength of the radiation is preferably 200 nm to 600 nm, more preferably 300 nm to 450 nm, and even more preferably 350 nm to 420 nm.

The ink composition exhibits sufficient sensitivity even when low-power radiation is used. Therefore, it is appropriate for the ink composition to be cured at an illuminance of an exposure surface of preferably 10 mW/cm$^2$ to 4,000 mW/cm$^2$ and more preferably 20 mW/cm$^2$ to 2,500 mW/cm$^2$.

As a radiation source, a mercury lamp, gas•solid-state laser, and the like are mainly used. Furthermore, as a light source used for curing an ultraviolet curable type ink for inkjet recording, a mercury lamp or a metal halide lamp is widely known. However, currently, from the viewpoint of environmental protection, it is strongly desired not to use a mercury lamp. Therefore, in view of industrial and environmental aspects, it is extremely useful to replace the mercury lamp with a GaN-based semiconductor ultraviolet light emitting device. In addition, LED (UV-LED) and LD (UV-LD) are expected to be used as a light source for a photocuring type inkjet recording since these devices are compact, have a long service life and high efficiency, and are low-cost.

Moreover, a light emitting diode (LED) and a laser diode (LD) can be used as the radiation source. Particularly, when a source of ultraviolet rays is required, an ultraviolet LED and an ultraviolet LD can be used. For example, NICHIA CORPORATION put an ultraviolet LED, of which the main emission spectrum has a wavelength between 365 nm to 420 nm, on the market. When the shorter wavelength is required, the LED disclosed in U.S. Pat. No. 6,084,250A that can emit radiation centered on the wavelength between 300 nm and 370 nm can be considered. Furthermore, other ultraviolet LEDs are available and can emit radiation of different ultraviolet bands. A UV-LED is the radiation source that is particularly preferred in the present invention. Particularly, a UV-LED having a peak wavelength at 350 nm to 420 nm is preferable.

The maximum illuminance of the LED on a recording medium is preferably 10 mW/cm$^2$ to 2,000 mw/cm$^2$, more preferably 20 mW/cm$^2$ to 1,000 mW/cm$^2$, and particularly preferably 50 mW/cm$^2$ to 800 mW/cm$^2$.

It is appropriate for the ink composition to be irradiated with radiation described above preferably for 0.01 seconds to 120 seconds, and more preferably for 0.1 seconds to 90 seconds.

The irradiation conditions and the basic irradiation method of the radiation are disclosed in JP1985-132767A (JP-S60-132767A). Specifically, a light source is disposed on both sides of a head unit including an ink ejection device, and the head unit and the light source are scanned by a so-called shuttle method to perform the irradiation of the radiation. The irradiation of the radiation is performed for a certain period of time (for example, preferably for 0.01 seconds to 0.5 seconds, more preferably for 0.01 seconds to 0.3 seconds, and even more preferably for 0.01 seconds to 0.15 seconds) after the ink is ejected. If the time period from the ejection of the ink to the irradiation is controlled to be within an extremely short period of time, it is possible to prevent the ink having been ejected to a recording medium from spreading before being cured. Furthermore, it is preferable to shorten the aforementioned time period because, even when a porous recording medium is used, the ink can be exposed to light before it permeates the recording medium into a deep portion that the light source does not reach, and therefore it is possible to prevent an unreacted monomer from remaining.

In addition, the curing may be completed by using another light source that is not driven. WO99/54415A discloses a method of using optical fiber and a method of irradiating a recording portion with UV light by puffing a collimated light source to a mirror surface disposed on a lateral surface of the head unit. These curing methods can also be applied to the manufacturing method of the present invention.

The inkjet recording device preferably uses a wide format inkjet printer system and more preferably uses a wide format UV inkjet printer system. The wide format inkjet printer system is a system in which the ejection of the ink composition from the inkjet recording device is performed substantially simultaneously with the irradiation of radiation for curing the ejected ink composition. Such a system can prepare a large-sized printed article within a short time. The wide format printer is generally defined as a printer which can perform printing at a width of equal to or greater than 24 inches (61 cm). Most of such printers perform printing at a width of 44 inches (111.7 cm) to 64 inches (162.5 cm), but some of them can perform printing at a width of up to 197 inches (500 cm).

As the wide format UV inkjet printer system, it is possible to use a LuxelJet UV360 GTW/XTW and UV550 GTW/XTW series and Acuity LED 1600 (all manufactured by FUJIFILM Corporation), inca SP320/SP320e/SP320S/SP320W (manufactured by Inca Digital Printers Ltd.), and the like.

In the method for manufacturing a printed article of the present invention, an ink set including the ink composition can be preferably used. For example, it is possible to use an ink set which is as a combination of a yellow ink composition, a cyan ink composition, a magenta ink composition, and a black ink composition. In order to obtain a full color image by using the ink composition, it is preferable to use an ink set which is a combination of dark color ink compositions of four colors consisting of yellow, cyan, magenta, and black. It is more preferable to use an ink set which is a combination of a group of dark color ink compositions of five colors consisting of yellow, cyan, magenta, black, and white and a group of ink compositions of light cyan and light magenta. Herein, the "dark color ink composition" means an ink composition in which the content of a pigment is greater than 1% by mass with respect to the total amount of the ink composition.

In order to obtain a color image by the method for manufacturing a printed article of the present invention, it is preferable to use ink compositions (ink set) of the respective colors and superpose the ink compositions on each other sequentially from the color with low brightness. Specifically, in a case where an ink set composed of ink compositions of yellow, cyan, magenta, and black is used, it is preferable to apply the ink compositions onto the inkjet recording sheet of the present invention in order of yellow→cyan→magenta→black. In a case where an ink set having at least a total of seven colors that is composed of a group of ink compositions of light cyan and light magenta and a group of dark color ink compositions of cyan, magenta, black, white, and yellow is used, it is preferable to apply the ink compositions onto the inkjet recording sheet of the present invention in order of white→light cyan→light magenta→yellow→cyan→magenta→black.

If the ink compositions are superposed on each other as described above sequentially from an ink with low brightness, the irradiated radiation easily reaches down to the ink in the lower portion. Consequently, it is possible to expect excellent curing sensitivity, reduction of residual monomers, and improvement of adhesiveness. The irradiation can be performed by ejecting all the color inks and exposing them to light at the same time. However, from the viewpoint of accelerating curing, it is preferable to exposing the inks to light one by one.

[Printed Article]

The printed article of the present invention is a printed article recorded by the method for manufacturing a printed article of the present invention. The constitution of the printed article of the present invention will be described based on a drawing.

An image portion 11 is formed on the inkjet recording sheet 10 of the present invention, and in this way, a printed article 20 of the present invention is embodied as illustrated in FIG. 4.

The printed article of the present invention is a high-quality printed article which is excellent in the ink adhesiveness and in the scratch resistance of the ink receiving layer 2 including the image portion 11 and a non-image portion.

The non-image portion (not shown in the drawing) refers to a portion other than the image portion 11 within the ink receiving layer 2 (that is, the ink receiving layer 2 in a portion to which the ink is not fixed).

The thickness of the image portion 11 is preferably 1 μm to 2 mm, and more preferably 1 μm to 800 μm.

The width of the printed article is not particularly limited, but is preferably set such that the printed article can be recorded by the wide format inkjet printer system. The width of the printed article is preferably 0.3 m to 5 m, more preferably 0.5 m to 4 m, and particularly preferably 1 m to 3 m. The preferred width of the inkjet recording sheet of the present invention is the same as the preferred width of the printed article of the present invention.

[Ornamental Glass]

The ornamental glass of the present invention includes glass and the printed article of the present invention disposed on the glass. The constitution of the ornamental glass of the present invention will be described based on a drawing.

Figure 5:
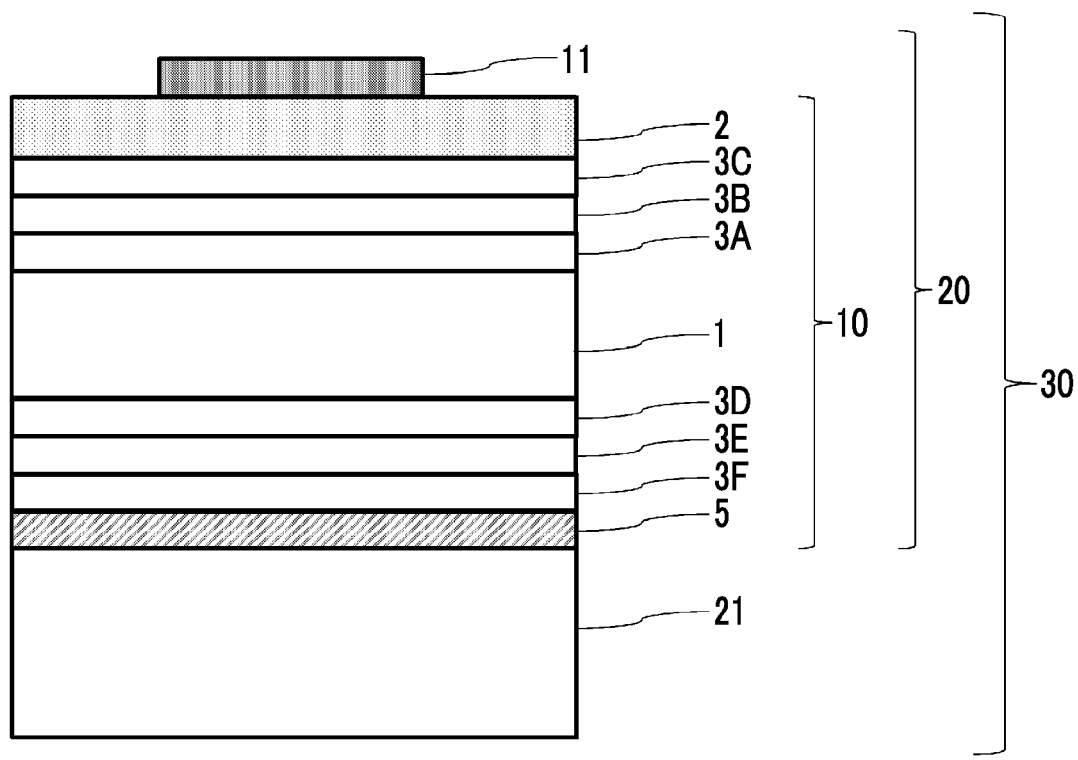
FIG. 5 is a schematic cross-sectional view of an example of ornamental glass of the present invention.

Ornamental glass 30 of the present invention includes glass 21 and the printed article 20 of the present invention disposed on the glass 21. In this way, the ornamental glass 30 is embodied as illustrated in FIG. 5. The ornamental glass of the present invention is high-quality ornamental glass which is excellent in the ink adhesiveness and in the scratch resistance of the ink receiving layer 2 including the image portion 11 and the non-image portion.

The glass used in the ornamental glass of the present invention is not particularly limited, and known glass can be used.

The method for manufacturing ornamental glass of the present invention is not particularly limited. It is preferable that the release film is peeled from the adhesive layer of the printed article of the present invention, and then the adhesive layer is stuck to glass in a state where the image portion is on the side opposite to the glass.

It is preferable to remove dirt•contaminants attached to the glass by using a cleaning roller, a cleaning wiper, or the like before the adhesive layer is stuck to the glass. When the contaminants are not removed, it is preferable to wipe the glass with a sanitary wiper containing alcohol.

Furthermore, it is preferable to remove dirt•contaminants attached to the surface of the printed article opposite to the image portion by using a cleaning roller, a cleaning wiper, or the like.

After the glass is stuck to the adhesive layer, it is preferable to remove air from the image portion by using a cleaning roller, a cleaning wiper, or the like.

Examples of the embodiments in which the ornamental glass of the present invention is used include show windows, automatic doors, glass shades, and the like.

EXAMPLES

Hereinafter, the present invention will be more specifically described based on examples. The materials, the amount thereof used, the proportions of thereof, the treatment contents, the treatment sequence, and the like shown in the following examples can be appropriately modified within a scope that does not depart from the gist of the present invention. Therefore, the scope of the present invention is not limited to the following specific examples.

Example 1

A polyethylene terephthalate (hereinafter, abbreviated to "PET") resin having an intrinsic viscosity of 0.64 that was polycondensed by using a Ti compound as a catalyst was dried until the moisture content thereof became equal to or less than 50 ppm, and melted in an extruder in which the heater temperature was set to be 270° C. to 300° C. The molten PET was extruded from a die portion onto a chill roller to which static electricity was applied, thereby obtaining a belt-like amorphous base. The obtained amorphous base was stretched by 3.3-fold in a longitudinal direction and then by 3.8-fold in a width direction, thereby obtaining a transparent support having a thickness of 50 μm.

The transparent support was transported at a transport rate of 105 m/min, and the both surfaces thereof were subjected to a corona discharge treatment under a condition of 955 J/m². Thereafter, the both surfaces were coated with the following coating solution B-1 by a bar coating method. Then the coating solution B-1 was dried for 1 minute at 145° C., and the both surfaces were subjected to a corona discharge treatment under a condition of 288 J/m² and then coated with a coating solution C-1 by a bar coating method. The coating solution C-1 was then dried for 1 minute at 145° C., thereby obtaining a laminate in which interlayers B and E formed by drying the coating solution B-1 and interlayers C and F formed by drying the coating solution C-1 were provided on both surfaces of the support in order of the interlayer F, the interlayer E, the transparent support, the interlayer B, and the interlayer C. The coating thickness of the each of the interlayers B, E, C, and F after drying was 0.3 μm.

The composition of the coating solution B-1 is as follows.

(Coating Solution B-1)

| | |
|---|---|
| Acrylic acid ester copolymer (JURYMER ET-410 manufactured by TOAGOSEI CO., LTD., solid content: 30%) | 31.1 parts by mass |
| Polyolefin (ARROW BASE SE-1013N manufactured by UNITIKA, LTD., solid content: 20% by mass) | 108.8 parts by mass |
| Cross-linking agent (carbodiimide compound) (CARBODILITE V-02-L2 manufactured by Nisshinbo Chemical Inc., solid content: 40%) | 25.7 parts by mass |
| Surfactant A (1% aqueous solution of NAROACTY CL-95 manufactured by Sanyo Chemical Industries, Ltd.) | 20.4 parts by mass |
| Surfactant B (1% aqueous solution of RAPISOL B-90 manufactured by NOF CORPORATION) | 8.5 parts by mass |
| Aqueous dispersion liquid of polystyrene latex (NIPPOL UFN 1008 manufactured by ZEON CORPORATION) | 1.2 parts by mass |
| Colloidal silica (SNOWTEX XL manufactured by NISSAN CHEMICAL INDUSTRIES, LTD) | 10.3 parts by mass |
| Distilled water | α parts by mass |

(α: the amount of distilled water was regulated such that the amount of the coating solution B-1 became 1,000 parts by mass in total.)

The composition of the coating solution C-1 is as follows.

(Coating Solution C-1)

| | |
|---|---|
| Aqueous solution of polyester resin (PLAS COAT Z687 manufactured by GOO CHEMICAL CO., LTD., solid content: 25%) | 51.2 parts by mass |
| Aqueous dispersion liquid of polyurethane resin (OLESTER UD350 manufactured by Mitsui Chemicals, Inc., solid content: 38%) | 33.7 parts by mass |
| Cross-linking agent (carbodiimide compound) (CARBODILITE V-02-L2 manufactured by Nisshinbo Chemical Inc., solid content: 40%) | 13.9 parts by mass |
| Surfactant A (1% aqueous solution of NAROACTY CL-95 manufactured by Sanyo Chemical Industries, Ltd.) | 45.7 parts by mass |
| Surfactant B (1% aqueous solution of RAPISOL B-90 manufactured by NOF CORPORATION) | 37.4 parts by mass |
| Slip agent (Carnauba wax dispersion CELLOSOLVE 524 manufactured by CHUKYO YUSHI CO., LTD., solid content: 30%) | 2.0 parts by mass |
| Distilled water | α parts by mass |

(α: the amount of distilled water was regulated such that the amount of the coating solution C-1 became 1,000 parts by mass in total.)

<Formation of Ink Receiving Layer>

By using a bar coater, the interlayer C was coated with a coating solution G-1 prepared to have the following composition, and the coating solution G-1 was dried for 20 seconds at 90° C. Thereafter, in nitrogen purging, by using an air-cooled metal halide lamp (manufactured by EYE GRAPHICS Co., Ltd.) of 160 W/cm, the coating layer was cured by being irradiated with ultraviolet rays of 77 mJ/cm$^2$, thereby forming an ink receiving layer. In this way, a laminate was formed in which the interlayer F, the interlayer E, the transparent support, the interlayer B, the interlayer C, and the ink receiving layer were provided in this order.

At this time, coating was performed such that the coating thickness of the ink receiving layer after drying became 14 μm.

(Composition of Coating Solution G-1)

| | |
|---|---|
| Polymerizable compound: acryl monomer (KAYARAD PET-30 manufactured by Nippon Kayaku Co., Ltd., pentaerythritol acrylate) | 299.62 parts by mass |
| Polymerizable compound: acryl monomer (VISCOAT V360 manufactured by OSAKA ORGANIC CHEMICAL INDUSTRY LTD., trimethylolpropane EO-modified triacrylate) | 179.73 parts by mass |
| Cellulose acetate butyrate (CAB manufactured by Eastman Chemical Japan Ltd.) | 7.35 parts by mass |
| Polymerization initiator (IRGACURE-127 manufactured by BASF) | 16.60 parts by mass |
| Fluorine-based surfactant (FP-13: compound represented by the following structural formula) | 0.600 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu | 148.85 parts by mass |

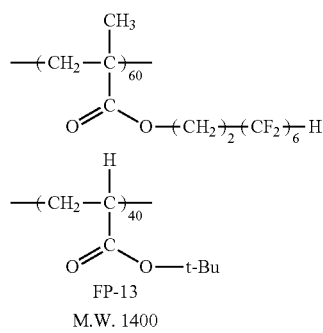

FP-13
M.W. 1400

<Coating for Adhesive Layer>

By a wire bar coating method, the interlayer F on the side opposite to the ink receiving layer was coated with a coating solution H-1 for an adhesive layer, and the coating solution H-1 was dried for 2 minutes in an oven at 100° C., thereby forming an adhesive layer. The coating was performed by using the following coating solution H-1 having concentration of solid content of 15% with an appropriately selected bar coater such that the film thickness after drying became about 25 μm, thereby forming a laminate in which the adhesive layer, the interlayer F, the interlayer E, the transparent support, the interlayer B, the interlayer C, and the ink receiving layer were provided in this order.

The coating solution H-1 was prepared by the following method. 100.0 Parts by mass of a main agent (BPS 6078TF manufactured by TOYOCHEM CO., LTD.), 200.0 parts by mass of a solvent (ethyl acetate), 0.1 parts by mass of a curing accelerator (BXX 3778-10 manufactured by TOYOCHEM CO., LTD.), and 1.0 parts by mass of a curing retarder (BXX 5638 manufactured by TOYOCHEM CO., LTD.) were mixed together for 30 minutes.

Thereafter, 5.0 parts by mass of a curing agent (BXX 6269 manufactured by TOYOCHEM CO., LTD.) was added thereto, followed by mixing for 30 minutes, thereby obtaining the coating solution H-1.

<Sticking of Release Film>

A release film (CERAPEEL BKE manufactured by TORAY ADVANCED FILM Co., Ltd.) having a thickness of 38 μm was laminated on the adhesive layer.

The release film was stuck to the adhesive layer by a lamination method in which the release film was pressed on the adhesive layer by using a roller. A laminate obtained in this way in which the release film, the interlayer H, the interlayer F, the interlayer E, the transparent support, the interlayer B, the interlayer C, and the ink receiving layer G were provided in this order was used as an inkjet recording sheet of Example 1.

<Printing of Image Portion>

As inks, radiation curable type solventless inks (manufactured by FUJIFILM Specialty Ink System Ltd., lot number: UVIJET KO 021 White, UVIJET KO 004 Black, UVIJET KO 215 Cyan, UVIJET KO 867 Magenta, UVIJET KO 052 Yellow) were used.

By using a "wide format UV inkjet press LuxelJet UV550GTW, manufactured by FUJIFILM Corporation" as a printer, a color image was printed twice on the ink receiving layer G of the inkjet recording sheet of Example 1 in a roll-to-roll method fine art mode (wavelength: 365 nm to 405 nm, printing speed: 22 m$^2$/hr) so as to form an image portion, thereby obtaining a printed article of Example 1 having a size of about 2 m (width)×1.5 m. The thickness of the image portion after drying was 500 μm to 720 μm.

<Formation of Ornamental Glass (Sticking to Glass Before Measuring Pencil Hardness)>

By using a cleaning roller, a cleaning wiper, or the like, dirt•contaminants attached to glass (manufactured by Corning Incorporated, 158 mm×88 mm×1.1 mm) were removed. When the contaminants were not removed, they were wiped with a sanitary wiper with alcohol. Furthermore, dirt•contaminants attached to the surface of the printed article of Example 1 opposite to the image portion was removed by using a cleaning roller, a cleaning wiper, or the like. The release film was peeled from the printed article of Example 1, the glass was then stuck to the adhesive layer in a state where the image portion was on the side opposite to the glass, and a tape having a width of 18 mm was stuck thereto. By using a cleaning roller, a cleaning wiper, or the like, air was removed from the image portion, and the obtained ornamental glass was used as ornamental glass of Example 1.

Example 2

An inkjet recording sheet, a printed article, and ornamental glass of Example 2 were obtained in the same manner as in Example 1, except that the coating solutions B-1 and C-1 of Example 1 were changed to the following coating solutions B-2 and C-2, and the coating thickness of each of the obtained interlayers B and E and the interlayers C and F was changed to 0.4 μm.

The composition of the coating solution B-2 is as follows.
(Coating Solution B-2)

| | |
|---|---|
| Acrylic acid ester copolymer (JURYMER ET-410 manufactured by TOAGOSEI CO., LTD., solid content: 30%) | 50.4 parts by mass |
| Polyolefin (ARROW BASE SE-1013N manufactured by UNITIKA, LTD., solid content: 20% by mass) | 113.4 parts by mass |
| Cross-linking agent (carbodiimide compound) (CARBODILITE V-02-L2 manufactured by Nisshinbo Chemical Inc., solid content: 40%) | 31.5 parts by mass |
| Surfactant A (1% aqueous solution of NAROACTY CL-95 manufactured by Sanyo Chemical Industries, Ltd.) | 16.7 parts by mass |
| Surfactant B (1% aqueous solution of RAPISOL B-90 manufactured by NOF CORPORATION) | 6.9 parts by mass |
| Aqueous dispersion liquid of polystyrene latex (NIPPOL UFN 1008 manufactured by ZEON CORPORATION) | 1.2 parts by mass |
| Preservative (1,2-Benzothiazolin-3-one manufactured by DAIDO CHEMICAL CO., LTD., solid content: 3.5%, methanol solvent) | 0.8 parts by mass |
| Distilled water | α parts by mass |

(α: the amount of distilled water was regulated such that the amount of the coating solution B-2 became 1,000 parts by mass in total.)

The composition of the coating solution C-2 is as follows.
(Coating Solution C-2)

| | |
|---|---|
| Aqueous solution of polyester resin (PLAS COAT Z592 manufactured by GOO CHEMICAL CO., LTD., solid content: 25%) | 119.3 parts by mass |
| Aqueous dispersion liquid of polyurethane resin (SUPERFLEX 150HS manufactured by DAI-ICHI KOGYO SEIYAKU CO., LTD., solid content: 38%) | 78.5 parts by mass |
| Cross-linking agent (oxazoline compound) (EPOCROS K-2020E manufactured by NIPPON SHOKUBAI CO., LTD., solid content: 40%) | 5.3 parts by mass |
| Surfactant A (1% aqueous solution of NAROACTY CL-95 manufactured by Sanyo Chemical Industries, Ltd.) | 40.8 parts by mass |
| Surfactant B (1% aqueous solution of RAPISOL B-90 manufactured by NOF CORPORATION) | 16.9 parts by mass |
| Slip agent (Carnauba wax dispersion CELLOSOLVE 524 manufactured by CHUKYO YUSHI CO., LTD., solid content: 30%) | 2.3 parts by mass |
| Preservative (1,2-Benzothiazolin-3-one manufactured by DAIDO CHEMICAL CO., LTD., solid content: 3.5%, methanol solvent) | 1.0 part by mass |
| Distilled water | α parts by mass |

(α: the amount of distilled water was regulated such that the amount of the coating solution C-2 became 1,000 parts by mass in total.)

Example 3

An inkjet recording sheet, a printed article, and ornamental glass of Example 3 were obtained in the same manner as in Example 1, except that the coating solutions B-1 and C-1 of Example 1 were changed to the following coating solutions B-3 and C-3, and the coating thickness of each of the obtained interlayers B and E and interlayers C and F was changed to 0.4 μm.

The composition of the coating solution B-3 is as follows.
(Coating Solution B-3)

| | |
|---|---|
| Aqueous solution of polyester resin (PLAS COAT Z687 manufactured by GOO CHEMICAL CO., LTD., solid content: 25%) | 139.7 parts by mass |
| Cross-linking agent (carbodiimide compound) (CARBODILITE V-02-L2 manufactured by Nisshinbo Chemical Inc., solid content: 40%) | 78.3 parts by mass |
| Surfactant A (1% aqueous solution of NAROACTY CL-95 manufactured by Sanyo Chemical Industries, Ltd.) | 16.7 parts by mass |
| Surfactant B (1% aqueous solution of RAPISOL B-90 manufactured by NOF CORPORATION) | 6.9 parts by mass |
| Aqueous dispersion liquid of polystyrene latex (Nippol UFN1008 manufactured by ZEON CORPORATION) | 1.2 parts by mass |
| Preservative (1,2-Benzothiazolin-3-one manufactured by DAIDO CHEMICAL CO., LTD., solid content: 3.5%, methanol solvent) | 0.8 parts by mass |
| Distilled water | α parts by mass |

(α: the amount of distilled water was regulated such that the amount of the coating solution B-3 became 1,000 parts by mass in total.)

The composition of the coating solution C-3 is as follows.
(Coating Solution C-3)

| | |
|---|---|
| Aqueous solution of polyester resin (PLAS COAT Z592 manufactured by GOO CHEMICAL CO., LTD., solid content: 25%) | 77.7 parts by mass |
| Aqueous dispersion liquid of polyurethane resin (SUPERFLEX 150HS manufactured by DAI-ICHI KOGYO SEIYAKU CO., LTD., solid contens: 38%) | 51.1 parts by mass |
| Cross-linking agent (oxazoline compound) (EPOCROS K-2020E manufactured by NIPPON SHOKUBAI CO., LTD., solid content: 40%) | 15.4 parts by mass |
| Surfactant A (1% aqueous solution of NAROACTY CL-95 manufactured by Sanyo Chemical Industries, Ltd.) | 29.7 parts by mass |
| Surfactant B (1% aqueous solution of RAPISOL B-90 manufactured by NOF CORPORATION) | 12.3 parts by mass |
| Slip agent (Carnauba wax dispersion CELLOSOLVE 524 manufactured by CHUKYO YUSHI CO., LTD., solid content: 30%) | 1.7 parts by mass |
| Preservative (1,2-Benzothiazolin-3-one manufactured by DAIDO CHEMICAL CO., LTD., solid content: 3.5%, methanol solvent) | 0.7 parts by mass |
| Distilled water | α parts by mass |

(α: the amount of distilled water was regulated such that the amount of the coating solution C-3 became 1,000 parts by mass in total.)

Example 4

A transparent support manufactured in the same manner as in Example 1 was transported at a transport rate of 105 m/min, and both surfaces thereof were subjected to a corona discharge treatment under a condition of 955 J/m$^2$ and then coated with the following coating solution B-4 by a bar coating method. Thereafter, the coating solution B-4 was dried for 1 minute at 145° C., thereby obtaining a laminate in which interlayers B and E formed by drying the coating solution B-4 were provided on both surfaces of the transparent support. The coating thickness of each of the interlayers B and E after drying was 0.8 μm.

The composition of the coating solution B-4 is as follows.
(Coating Solution B-4)

| | |
|---|---|
| Aqueous solution of polyester resin (PLAS COAT Z592 manufactured by GOO CHEMICAL CO., LTD., solid content: 25%) | 155.5 parts by mass |
| Aqueous dispersion liquid of polyurethane resin (SUPERFLEX 150HS manufactured by DAI-ICHI KOGYO SEIYAKU CO., LTD., solid content: 38%) | 102.2 parts by mass |

-continued

| | |
|---|---|
| Cross-linking agent (oxazoline compound) (EPOCROS K-2020E manufactured by NIPPON SHOKUBAI CO., LTD., solid content: 40%) | 30.8 parts by mass |
| Surfactant A (1% aqueous solution of NAROACTY CL-95 manufactured by Sanyo Chemical Industries, Ltd.) | 12.3 parts by mass |
| Surfactant B (1% aqueous solution of RAPISOL B-90 manufactured by NOF CORPORATION) | 12.3 parts by mass |
| Slip agent (Carnauba wax dispersion CELLOSOLVE 524 manufactured by CHUKYO YUSHI CO., LTD., solid content: 30%) | 1.7 parts by mass |
| Preservative (1,2-Benzothiazolin-3-one manufactured by DAIDO CHEMICAL CO., LTD., solid content: 3.5%, methanol solvent) | 0.7 parts by mass |
| Aqueous dispersion liquid of polystyrene latex (Nippol UFN1008 manufactured by ZEON CORPORATION) | 1.0 parts by mass |
| Distilled water | α parts by mass |

(α: the amount of distilled water was regulated such that the amount of the coating solution B-4 became 1,000 parts by mass in total.)

An ink receiving layer G was formed on the obtained interlayer B in the same manner as in Example 1, and adhesive layer H was formed on the obtained interlayer E in the same manner as in Example 1, and a release film was formed on the obtained adhesive layer H in the same manner as in Example 1, thereby obtaining an inkjet recording sheet of Example 4. Thereafter, a printed article and ornamental glass of Example 4 were obtained in the same manner as in Example 1.

Example 5

A polyethylene terephthalate (hereinafter, abbreviated to "PET") resin having an intrinsic viscosity of 0.64 that was polycondensed by using a Ti compound as a catalyst was dried until the moisture content thereof became equal to or less than 50 ppm, and melted in an extruder in which the heater temperature was set to be 270° C. to 300° C. The molten PET was extruded from a die portion onto a chill roller to which static electricity was applied, thereby obtaining a belt-like amorphous base. The obtained belt-like amorphous base was stretched by 3.3-fold in a longitudinal direction and then subjected to a corona discharge treatment in the air, and both surfaces thereof were coated with the following coating solution A-1 by a bar coating method. In a state of being gripped by clips, the coated uniaxially stretched film was guided to a preheating zone and dried at 90° C. Then the film was continuously was stretched by 3.8-fold in a width direction in an heating zone of 100° C. and then thermally treated in a heating zone of 215° C., thereby obtaining a laminate having a thickness of 50 μm. The coating thickness of the interlayers A and D after drying that were formed by drying the coating solution A-1 was 0.04 μm.

(Coating Solution A-1)

The coating solution A-1 used in the present example was prepared according to the following method. A reaction container was filled with 95 parts of dimethyl terephthalate, 95 parts of dimethyl isophthalate, 35 parts of ethylene glycol, 145 parts of neopentyl glycol, 0.1 parts of zinc acetate, and 0.1 parts of antimony trioxide, and an ester exchange reaction was performed for 3 hours at 180° C. Thereafter, 6.0 parts of sodium 5-sulfoisophthalate was added thereto, and an esterification reaction was performed for 1 hour at 240° C. Then, a polycondensation reaction was performed for 2 hours at 250° C. under reduced pressure (10 mmHg to 0.2 mmHg), thereby obtaining a copolymerized polyester-based resin having a molecular weight of 19,500 and a softening point of 60° C. 67 parts of a 30% aqueous dispersion liquid of the obtained copolymerized polyester-based resin (A), 40 parts of a 20% aqueous solution (trade name: ELASTRON H-3, manufactured by DAI-ICHI KOGYO SEIYAKU CO., LTD.) of a self-crosslinking polyurethane resin (B) containing an isocyanate group blocked by sodium bisulfate, 0.5 parts of a catalyst for ELASTRON (trade name: Cat 64, manufactured by DAI-ICHI KOGYO SEIYAKU CO., LTD.), 478 parts of water, and 5 parts of isopropyl alcohol were mixed together. To the mixture, 1 part by mass of an anionic surfactant (RAPISOL A-90 manufactured by NOF CORPORATION), 2 parts of a 20% aqueous dispersion liquid of fine particles A (SNOWTEX OL manufactured by NISSAN CHEMICAL INDUSTRIES, LTD, average particle size: 40 nm), and 0.5 parts of a 4% aqueous dispersion liquid of fine particles B (AEROSIL OX50 manufactured by Nippon Aerosil Co., Ltd., average particle size: 500 nm) were added thereto, thereby obtaining the coating solution A-1.

The amorphous base provided with the interlayers A and D formed by drying the obtained coating solution A-1 was transported in a transport rate of 105 m/min, and the both surfaces thereof were subjected to a corona discharge treatment under a condition of 955 J/m² and coated with the following coating solution B-5 by a bar coating method. Thereafter, the coating solution B-5 was dried for 1 minute at 145° C., thereby obtaining a laminate in which the interlayers B and E were provided on both surfaces of the transparent support. The coating thickness of each of the interlayers B and E after drying was 0.5 μm.

The composition of the coating solution B-5 is as follows.

(Coating Solution B-5)

| | |
|---|---|
| Aqueous solution of polyester resin (PLAS COAT Z592 manufactured by GOO CHEMICAL CO., LTD., solid content: 25%) | 16.4 parts by mass |
| Aqueous dispersion liquid of polyurethane resin (SUPERFLEX 150HS manufactured by DAI-ICHI KOGYO SEIYAKU CO., LTD., solid content: 38%) | 68.4 parts by mass |
| Aqueous dispersion liquid of acrylic resin (AS-563A manufactured by DAICEL FINECHEM LTD., solid content: 28%) | 92.5 parts by mass |
| Cross-linking agent (oxazoline compound) (EPOCROS K-2020E manufactured by NIPPON SHOKUBAI CO., LTD., solid content: 40%) | 10.3 parts by mass |
| Surfactant A (1% aqueous solution of NAROACTY CL-95 manufactured by Sanyo Chemical Industries, Ltd.) | 29.7 parts by mass |
| Surfactant B (1% aqueous solution of RAPISOL B-90 manufactured by NOF CORPORATION) | 12.3 parts by mass |
| Slip agent (Carnauba wax dispersion CELLOSOLVE 524 manufactured by CHUKYO YUSHI CO., LTD., solid content: 30%) | 1.7 parts by mass |
| Preservative (1,2-Benzothiazolin-3-one manufactured by DAIDO CHEMICAL CO., LTD., solid content: 3.5%, methanol solvent) | 0.7 parts by mass |
| Aqueous dispersion liquid of polystyrene latex (Nippol UFN1008 manufactured by ZEON CORPORATION) | 0.7 parts by mass |
| Distilled water | α parts by mass |

(α: the amount of distilled water was regulated such that the amount of the coating solution B-5 became 1,000 parts by mass in total.)

The ink receiving layer G was formed on the obtained interlayer B in the same manner as in Example 1, the adhesive layer H was formed on the interlayer E in the same manner as in Example 1, and a release film was formed on the obtained adhesive layer H in the same manner as in Example 1, thereby obtaining an inkjet recording sheet of Example 5. Thereafter, a printed article and ornamental glass of Example 5 were obtained in the same manner as in Example 1.

Example 6

A polyethylene terephthalate (hereinafter, abbreviated to "PET") resin having an intrinsic viscosity of 0.64 that was polycondensed by using a Ti compound as a catalyst was dried until the moisture content thereof became equal to or less than 50 ppm, and melted in an extruder in which the heater temperature was set to be 270° C. to 300° C. The molten PET was extruded from a die portion onto a chill roller to which static electricity was applied, thereby obtaining a belt-like amorphous base. The obtained belt-like amorphous base was stretched by 3.3-fold in a longitudinal direction and then subjected to a corona discharge treatment in the air, and both surfaces thereof was coated with the following coating solution A-1 by a bar coating method. In a state of being gripped by clips, the coated uniaxially stretched film was guided to a preheating zone and dried at 90° C. Then the film was continuously was stretched by 3.8-fold in a width direction in an heating zone of 100° C. and then thermally treated in a heating zone of 215° C., thereby obtaining a laminate having a thickness of 50 μm. The coating thickness of the interlayers A and D after drying that were formed by drying the coating solution A-1 was 0.04 μm.

The ink receiving layer G was formed on the obtained interlayer A in the same manner as in Example 1, the adhesive layer H was formed on the obtained interlayer D in the same manner as in Example 1, and a release film was formed on the obtained interlayer H in the same manner as in Example 1, thereby obtaining an inkjet recording sheet of Example 6. Thereafter, a printed article and ornamental glass of Example 6 were obtained in the same manner as in Example 1.

Example 7

A transparent support manufactured in the same manner as in Example 1 was transported in a transport rate of 105 m/min, and one surface thereof was subjected to a corona discharge treatment under a condition of 955 J/m². Then, one of the surfaces was coated with the coating solution B-1 by a bar coating method, the coating solution B-1 was dried for 1 minute at 145° C., and the coated surface was subjected to a corona discharge treatment under a condition of 288 J/m². Subsequently, the surface coated with the coating solution B-1 was coated with the coating solution C-1 by a bar coating method. Thereafter, the coating solution B-1 was dried for 1 minute at 145° C., thereby obtaining a laminate in which the interlayer B formed by drying the coating solution B-1 and the interlayer C formed by drying the coating solution C-1 were provided on one surface of the transparent support. The coating thickness of each of the interlayers B and C after drying was 0.3 μm.

Subsequently, the other surface of the transparent support was subjected to a corona discharge treatment under a condition of 600 J/m² and then coated with the following coating solution E-1 by a bar coating method. The coating solution E-1 was dried for 1 minute at 145° C., thereby obtaining a laminate in which the interlayer E formed by drying the coating solution E-1 was provided on one surface of the transparent support. The coating thickness of the interlayer E after drying was 0.1

The composition of the coating solution E-1 is as follows. (Coating Solution E-1)

| | |
|---|---|
| Acrylic resin binder (EM48D manufactured by DAICEL CORPORATION, solid content: 27.5%) | 42.6 parts by mass |
| Compound having a plurality of carbodiimide structures (CARBODILITE V-02-L2 manufactured by Nisshinbo Chemical Inc., solid content: 40%) | 4.8 parts by mass |
| Surfactant A (1% aqueous solution of RAPISOL B-90 manufactured by Sanyo Chemical Industries, Ltd., anionic) | 15.8 parts by mass |
| Surfactant B (1% aqueous solution of NAROACTY CL-95 manufactured by NOF CORPORATION, nonionic) | 15.8 parts by mass |
| Dispersion liquid of fine silica particles (aqueous dispersion of AEROSIL OX-50 manufactured by Nippon Aerosil Co., Ltd., solid content: 10%) | 1.9 parts by mass |
| Colloidal silica (SNOWTEX XL manufactured by NISSAN CHEMICAL INDUSTRIES, LTD, solid content: 40.5%) | 0.8 parts by mass |
| Slip agent (Carnauba wax dispersion CELLOSOLVE 524 manufactured by CHUKYO YUSHI CO., LTD., solid content: 30%) | 1.9 parts by mass |
| Distilled water | Added such that the amount of the coating solution became 1,000 parts by mass in total |

The ink receiving layer G was formed on the obtained interlayer C in the same manner as in Example 1, the adhesive layer H was formed on the obtained interlayer E in the same manner as in Example 1, and a release film was formed on the obtained adhesive layer H in the same manner as in Example 1, thereby obtaining an inkjet recording sheet of Example 7. Thereafter, a printed article and ornamental glass of Example 7 were obtained in the same manner as in Example 1.

Example 8

An inkjet recording sheet of Example 8 was obtained in the same manner as in Example 1, except that in forming the ink receiving layer of Example 1, the irradiation amount of the ultraviolet rays was changed to 148 mJ/cm² from 77 mJ/cm². Thereafter, a printed article and ornamental glass of Example 8 were obtained in the same manner as in Example 1.

Example 9

An inkjet recording sheet of Example 9 was obtained in the same manner as in Example 5, except that in forming the ink receiving layer of Example 5, the irradiation amount of the ultraviolet rays was changed to 148 mJ/cm² from 77 mJ/cm². Thereafter, a printed article and ornamental glass of Example 9 were obtained in the same manner as in Example 5.

Example 10

An inkjet recording sheet of Example 10 was obtained in the same manner as in Example 1, except that the coating solution H-1 of Example 1 was changed to the following coating solution H-2. Thereafter, a printed article and ornamental glass of Example 10 were obtained in the same manner as in Example 1.

The coating solution H-2 was prepared by the following method. 100 parts by mass of a main agent (EG354J manufactured by TOYOCHEM CO., LTD.), 50 parts by mass of a solvent (ethyl acetate), 0.788 parts by mass of an additive (BXX 6342 manufactured by TOYOCHEM CO., LTD.), and 31.5 parts by mass of a curing accelerator (BXX 4805 manufactured by TOYOCHEM CO., LTD.) were mixed together for 30 minutes. Thereafter, 18.8 parts by mass of a curing agent (BXX 6460 manufactured by TOYOCHEM CO., LTD.) was added thereto, followed by mixing for 30 minutes, thereby obtaining the coating solution H-2.

Example 11

An inkjet recording sheet of Example 11 was obtained in the same manner as in Example 1, except that in forming the ink receiving layer G of Example 1, the amount of the coating solution G-1 coating the support was changed such that the coating thickness of the ink receiving layer G after drying was changed to 28 μm from 14 μm. Thereafter, a printed article and ornamental glass of Example 11 were obtained in the same manner as in Example Example 12

An inkjet recording sheet of Example 12 was obtained in the same manner as in Example 1, except that in forming the ink receiving layer G of Example 1, the amount of the coating solution G-1 coating the support was changed such that the coating thickness of the ink receiving layer G after drying was changed to 5 μm from 14 μm. Thereafter, a printed article and ornamental glass of Example 12 were obtained in the same manner as in Example 1.

Example 13

An inkjet recording sheet of Example 13 was obtained in the same manner as in Example 1, except that in forming the ink receiving layer G of Example 1, the coating solution G-1 was changed to the following coating solution G-2. Thereafter, a printed article and ornamental glass of Example 13 were obtained in the same manner as in Example 1.

The composition of the coating solution G-2 is as follows.
(Coating Solution G-2)

| | |
|---|---|
| Monomer of polymerizable compound (KAYARAD PET-30 manufactured by Nippon Kayaku Co., Ltd., pentaerythritol triacrylate) | 299.62 parts by mass |
| Monomer of polymerizable compound (VISCOAT V360 manufactured by OSAKA ORGANIC CHEMICAL INDUSTRY LTD., trimethylolpropane ethylene oxide (EO)-added triacrylate) | 179.73 parts by mass |
| Cellulose acetate butyrate (CAB manufactured by Eastman Chemical Japan Ltd.) | 7.35 parts by mass |
| Photopolymerization initiator (IRGACURE-127 manufactured by BASF) | 3.2 parts by mass |
| Fluorine-based surfactant (FP-13 having the following structure) | 0.600 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 148.85 parts by mass |

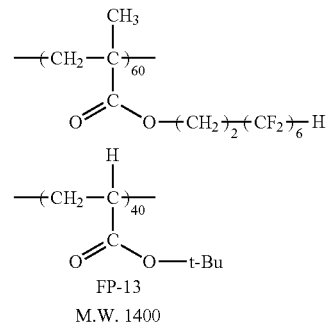

FP-13
M.W. 1400

Example 14

An inkjet recording sheet of Example 14 was obtained in the same manner as in Example 12, except that in forming the ink receiving layer G of Example 12, the coating solution G-1 was changed to the following coating solution G-3. Thereafter, a printed article and ornamental glass of Example 14 were obtained in the same manner as in Example 12.

The composition of the coating solution G-3 is as follows.
(Composition of Coating Solution G-3)

| | |
|---|---|
| Polymerizable compound: acryl monomer (KAYARAD PET-30 manufactured by Nippon Kayaku Co., Ltd., pentaerythritol triacrylate) | 299.62 parts by mass |
| Polymerizable compound: acryl monomer (VISCOAT V360 manufactured by OSAKA ORGANIC CHEMICAL INDUSTRY LTD., trimethylolpropane EO-modified triacrylate) | 179.73 parts by mass |
| Cellulose acetate butyrate (CAB manufactured by Eastman Chemical Japan Ltd.) | 7.35 parts by mass |
| Photopolymerization initiator (IRGACURE-127 manufactured by BASF) | 16.60 parts by mass |
| Fluorine-based surfactant (MEGAFACE F780 manufactured by DIC Corporation) | 2.00 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 147.45 parts by mass |

Example 15

An inkjet recording sheet of Example 15 was obtained in the same manner as in Example 12, except that in forming the ink receiving layer G of Example 12, the coating solution G-1 was changed to the following coating solution G-4. Thereafter, a printed article and ornamental glass of Example 15 were obtained in the same manner as in Example 12.

The composition of the coating solution G-4 is as follows.
(Composition of Coating Solution G-4)

| | |
|---|---|
| Polymerizable compound: acryl monomer (KAYARAD PET-30 manufactured by Nippon Kayaku Co., Ltd., pentaerythritol triacrylate) | 299.62 parts by mass |
| Polymerizable compound: acryl monomer (VISCOAT V360 manufactured by OSAKA ORGANIC CHEMICAL INDUSTRY LTD., trimethylolpropane ethylene oxide (EO)-modified triacrylate) | 179.73 parts by mass |

| | |
|---|---|
| Cellulose acetate butyrate (CAB manufactured by Eastman Chemical Japan Ltd.) | 7.35 parts by mass |
| Photopolymerization initiator (IRGACURE-127 manufactured by BASF) | 16.60 parts by mass |
| Fluorine-based surfactant (MEGAFACE F784 manufactured by DIC Corporation) | 2.00 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 147.45 parts by mass |

Example 16

An inkjet recording sheet of Example 16 was obtained in the same manner as in Example 12, except that the coating solution H-1 of Example 12 was changed to the following coating solution H-3. Thereafter, a printed article and ornamental glass of Example 16 were obtained in the same manner as in Example 12.

The coating solution H-3 was prepared by the following method. 100 parts by mass of a main agent (BPS 5296 manufactured by TOYOCHEM CO., LTD.) and 50 parts by mass of a solvent (ethyl acetate) were mixed together for 30 minutes. Thereafter, 2.0 parts by mass of a curing agent (BHS 8515 manufactured by TOYOCHEM CO., LTD.) was added thereto, followed by mixing for 30 minutes, thereby obtaining the coating solution H-3.

Example 17

An inkjet recording sheet of Example 17 was obtained in the same manner as in Example 12, except that the coating solution H-1 of Example 12 was changed to the following coating solution H-4. Thereafter, a printed article and ornamental glass of Example 17 were obtained in the same manner as in Example 12.

The coating solution H-4 was prepared by the following method. 100 parts by mass of a main agent (BPS 5296 manufactured by TOYOCHEM CO., LTD.) and 50 parts by mass of a solvent (ethyl acetate) were mixed together for 30 minutes. Thereafter, 0.5 parts by mass of a curing agent (BXX 4773 manufactured by TOYOCHEM CO., LTD.) was added thereto, followed by mixing for 30 minutes, thereby obtaining the coating solution H-4.

Example 18

An inkjet recording sheet of Example 18 was obtained in the same manner as in Example 12, except that the coating solution H-1 of Example 12 was changed to the following coating solution H-5. Thereafter, a printed article and ornamental glass of Example 18 were obtained in the same manner as in Example 12.

The coating solution H-5 was prepared by the following method. 100 parts by mass of a main agent (BPS 5963 manufactured by TOYOCHEM CO., LTD.) and 50 parts by mass of a solvent (ethyl acetate) were mixed together for 30 minutes. Thereafter, 2.0 parts by mass of a curing agent (BHS 8515 manufactured by TOYOCHEM CO., LTD.) was added thereto, followed by mixing for 30 minutes, thereby obtaining the coating solution H-5.

Example 19

An inkjet recording sheet of Example 19 was obtained in the same manner as in Example 12, except that the coating solution H-1 of Example 12 was changed to the following coating solution H-6. Thereafter, a printed article and ornamental glass of Example 19 were obtained in the same manner as in Example 12.

The coating solution H-6 was prepared by the following method. 100 parts by mass of a main agent (BPS 5963 manufactured by TOYOCHEM CO., LTD.) and 50 parts by mass of a solvent (ethyl acetate) were mixed together for 30 minutes. Thereafter, 0.5 parts by mass of a curing agent (BXX 4773 manufactured by TOYOCHEM CO., LTD.) was added thereto, followed by mixing for 30 minutes, thereby obtaining the coating solution H-6.

Example 20

An inkjet recording sheet of Example 20 was obtained in the same manner as in Example 16, except that in Example 16, instead of the laminate in which the interlayer F, the interlayer E, the transparent support, the interlayer B, and the interlayer C were disposed in this order, COSMOSHINE A4300-50 (in which the interlayer F, the interlayer E, the interlayer B, and the interlayer C are not laminated) from TOYOBO CO., LTD. was used. Thereafter, a printed article and ornamental glass of Example 20 were obtained in the same manner as in Example 1.

Example 21

An inkjet recording sheet of Example 21 was obtained in the same manner as in Example 20, except that in Example 20, the coating solution H-3 was changed to the coating solution H-5 prepared in Example 18. Thereafter, a printed article and ornamental glass of Example 21 were obtained in the same manner as in Example 1.

Example 22

An inkjet recording sheet of Example 22 was obtained in the same manner as in Example 12, except that in forming the ink receiving layer G of Example 12, the coating solution G-1 was changed to the following coating solution G-6. Thereafter, a printed article and ornamental glass of Example 22 were obtained in the same manner as in Example 12.

The composition of the coating solution G-6 is as follows.

(Composition of Coating Solution G-6)

| | |
|---|---|
| Polymerizable compound: acryl monomer (KAYARAD PET-30 manufactured by Nippon Kayaku Co., Ltd., pentaerythritol triacrylate) | 299.62 parts by mass |
| Polymerizable compound: acryl monomer (VISCOAT V360 manufactured by OSAKA ORGANIC CHEMICAL INDUSTRY LTD., trimethylolpropane EO-modified triacrylate) | 179.73 parts by mass |
| Cellulose acetate butyrate (CAB manufactured by Eastman Chemical Japan Ltd.) | 7.35 parts by mass |
| Photopolymerization initiator (IRGACURE-127 manufactured by BASF) | 16.60 parts by mass |
| Fluorine-based surfactant (GF-1 having the following structure) | 2.00 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 147.45 parts by mass |

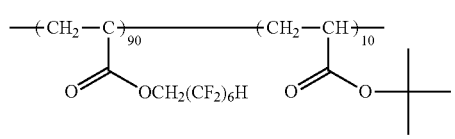

GF-1

Example 23

An inkjet recording sheet of Example 23 was obtained in the same manner as in Example 12, except that in forming the ink receiving layer G of Example 12, the coating solution G-1 was changed to the following coating solution G-7. Thereafter, a printed article and ornamental glass of Example 23 were obtained in the same manner as in Example 12.

The composition of coating solution G-7 is as follows.
(Composition of Coating Solution G-7)

| | |
|---|---|
| Polymerizable compound: acryl monomer (KAYARAD PET-30 manufactured by Nippon Kayaku Co., Ltd., pentaerythritol triacrylate) | 299.62 parts by mass |
| Polymerizable compound: acryl monomer (VISCOAT V360 manufactured by OSAKA ORGANIC CHEMICAL INDUSTRY LTD., trimethylolpropane EO-modified triacrylate) | 179.73 parts by mass |
| Cellulose acetate butyrate (CAB manufactured by Eastman Chemical Japan Ltd.) | 7.35 parts by mass |
| Photopolymerization initiator (IRGACURE-127 manufactured by BASF) | 16.60 parts by mass |
| Fluorine-based surfactant (GF-2 having the following structure) | 2.00 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 147.45 parts by mass |

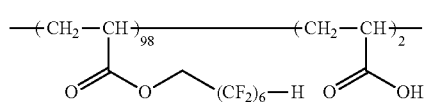

GF-2

Example 24

An inkjet recording sheet of Example 24 was obtained in the same manner as in Example 12, except that in forming the ink receiving layer G of Example 12, the coating solution G-1 was changed to the following coating solution G-8. Thereafter, a printed article and ornamental glass of Example 24 were obtained in the same manner as in Example 12.

The composition of coating solution G-8 is as follows.
(Composition of Coating Solution G-8)

| | |
|---|---|
| Polymerizable compound: acryl monomer (KAYARAD PET-30 manufactured by Nippon Kayaku Co., Ltd., pentaerythritol triacrylate) | 299.62 parts by mass |
| Polymerizable compound: acryl monomer (VISCOAT V360 manufactured by OSAKA ORGANIC CHEMICAL INDUSTRY LTD., trimemylolpropane EO-modified triacrylate) | 179.73 parts by mass |
| Cellulose acetate butyrate (CAB manufactured by Eastman Chemical Japan Ltd.) | 7.35 parts by mass |
| Photopolymerization initiator (IRGACURE-127 manufactured by BASF) | 16.60 parts by mass |
| Fluorine-based surfactant (GF-3 having the following structure) | 2.00 parts by mass |
| Solvent (methyl isobutyl ketone (MIBK) solvent manufactured by Mitsui Chemicals, Inc.) | 347.29 parts by mass |
| Solvent (methyl ethyl ketone (MEK) manufactured by TonenGeneral Sekiyu K.K.) | 147.45 parts by mass |

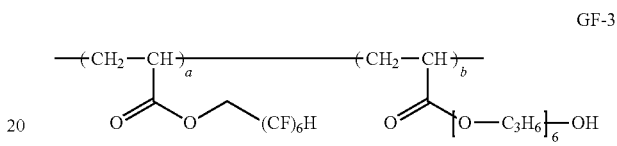

GF-3

$a/b=90/10$ (% by mass)

Comparative Example 1

An inkjet recording sheet of Comparative example 1 was obtained in the same manner as in Example 1, except that in Example 1, the ink receiving layer G was not formed.

Thereafter, a printed articles and ornamental glass of Comparative example 1 were obtained in the same manner as in Example 1, except that an image portion was formed not on the ink receiving layer G of the inkjet recording sheet of Example 1 but on the interlayer C of the inkjet recording sheet of Comparative example 1.

Comparative Example 2

An inkjet recording sheet of Comparative example 2 was obtained in the same manner as in Example 1, except that in forming the ink receiving layer G of Example 1, the following coating solution G-5 was used instead of the coating solution G-1, and the ink receiving layer G was formed by the following method.

The composition of the coating solution G-5 is as follows.
(Coating Solution G-5)

| | |
|---|---|
| Aqueous acetic acid solution (1% aqueous solution of industrial acetic acid manufactured by DAICEL CORPORATION) | 402.0 parts by mass |
| 3-Glycidoxypropyl triethoxysilane (KBE-403 manufactured by Shin-Etsu Chemical Co., Ltd.) | 110.0 parts by mass |
| Tetraethoxysilane (KBE-04 manufactured by Shin-Etsu Chemical Co., Ltd.) | 127.6 parts by mass |
| Curing agent (ALUMICHELATE A (W) manufactured by Kawaken Fine Chemicals Co., Ltd.) | 1.3 parts by mass |
| Surfactant C (10% aqueous solution of SANDEDDO BL manufactured by Sanyo Chemical Industries, Ltd., anionic) | 14.7 parts by mass |
| Surfactant A (1% aqueous solution of NAROACTY CL-95 manufactured by Sanyo Chemical Industries, Ltd., nonionic) | 40.9 parts by mass |
| Distilled water | α parts by mass |

(α: regulated such that the amount of the coating solution G-5 became 1,000 parts by mass in total)

The coating solution G-5 was prepared by the following method.

An aqueous acetic acid solution was vigorously stirred in a thermostatic bath at 25° C., and in this state, 3-glycidoxy-propyl triethoxysilane was added dropwise thereto for 3 minutes. After being stirred for 1 hour, the aqueous acetic acid solution was continuously vigorously stirred in a thermostatic bath at 30° C., and in this state, tetraethoxysilane was added thereto for 5 minutes. Thereafter, the aqueous acetic acid solution was continuously stirred for 2 hours, and then cooled to 10° C. for 1 hour. The aqueous solution obtained in this way was named an aqueous solution X.

Subsequently, a curing agent, a surfactant, and distilled water were added thereto, and the resultant was dispersed for 5 minutes by ultrasonic waves. The liquid obtained in this way was named an aqueous solution Y. The aqueous solution Y was added to the aqueous solution X and then cooled to 10° C.

The surface of the interlayer C was subjected to a corona discharge treatment under a condition of 200 J/m$^2$ and then coated with the coating solution G-5 by a bar coating method. The amount of the coating solution G-5 coating the interlayer C was controlled to become 13.8 cm$^3$/m$^2$ and dried for 1 minute at 145° C. In this way, an ink receiving layer G having an average film thickness of about 0.85 μm was formed.

Thereafter, a printed article and ornamental glass of Comparative example 2 were obtained in the same manner as in Example 1, except that the inkjet recording sheet of Comparative example 2 was used.

Comparative Example 3

An inkjet recording sheet of Comparative example 3 was obtained in the same manner as in Example 4, except that in Example 4, the interlayer B was formed by using the following coating solution B-6 instead of the coating solution B-4, and the ink receiving layer G was not formed.

The composition of the coating solution B-6 is as follows. (Coating Solution B-6)

| | |
|---|---|
| Aqueous solution of polyester resin (PLAS COAT Z592 manufactured by GOO CHEMICAL CO., LTD., solid content: 25%) | 155.5 parts by mass |
| Aqueous dispersion liquid of polyurethane resin (SUPERFLEX 150HS manufactured by DAI-ICHI KOGYO SEIYAKU CO., LTD., solid content: 38%) | 102.2 parts by mass |
| Cross-linking agent (melamine compound) (BECKAMINE M-3 manufactured by DIC Corporation, solid content: 80%) | 14.6 parts by mass |
| Surfactant A (1% aqueous solution of NAROACTY CL-95 manufactured by Sanyo Chemical Industries, Ltd.) | 12.3 parts by mass |
| Surfactant B (1% aqueous solution of RAPISOL B-90 manufactured by NOF CORPORATION) | 12.3 parts by mass |
| Slip agent (Carnauba wax dispersion CELLOSOLVE 524 manufactured by CHUKYO YUSHI CO., LTD., solid content: 30%) | 1.7 parts by mass |
| Preservative (1,2-benzothiazolin-3-one manufactured by DAIDO CHEMICAL CO., LTD., solid content: 3.5%, methanol solvent) | 0.7 parts by mass |
| Aqueous dispersion liquid of polystyrene latex (Nippol UFN1008 manufactured by ZEON CORPORATION) | 1.0 part by mass |
| Distilled water | α parts by mass |

(α: the amount of distilled water was regulated such that the amount of the coating solution B-6 became 1,000 parts by mass in total.)

Thereafter, a printed article and ornamental glass of Comparative example 3 were obtained in the same manner as in Example 1, except that an image portion was formed not on the ink receiving layer G of inkjet recording sheet of Example 4 but on the interlayer B of the inkjet recording sheet of Comparative example 3.

[Evaluation]

The inkjet recording sheets, the printed articles, and the ornamental glass of Examples 1 to 24 and Comparative examples 1 to 3 were evaluated as below. The obtained results are shown in the following Tables 1 and 2.

In the following Tables 1 and 2, PE represents polyester, PU represents polyurethane, and PO represents polyolefin.

<Release Properties of Release Film>

The inkjet recording sheet of each of examples and comparative examples was evaluated based on the following criteria, in terms of the release properties of the release film from the adhesive layer H.

A: At the time of peeling the release film, the adhesive layer did not stick thereto, and the release film could be easily peeled off.

B: At the time of peeling the release film, the adhesive layer easily stuck to the release film, but the adhesive layer was not peeled off C: At the time of peeling the release film, the adhesive layer stuck to the release film and was peeled off A and B are acceptable product levels, and C is a rejection level.

<Evaluation of ink adhesiveness>

Immediately after a color image was printed on the printed article of each of the examples and comparative examples to which glass was not yet been stuck, by using a single-edged razor, eleven lines of scratches was made on the image portion of the printed articles in each of the vertical and horizontal directions so as to form 100 squares. Thereafter, an adhesive tape (600 manufactured by 3M) was stuck thereto. The surface of the tape was then rubbed with a rubber eraser such that the tape was completely attached to the image portion. Subsequently, the tape was peeled back at an angle of 90° with respect to the horizontal plane, and the number of squares peeled off was counted. In this way, the adhesive strength with respect to the ink was evaluated into 5 levels (A to E) described below.

A: No square was peeled off.

B: The number of squares peeled off was equal to or greater than 1 and less than 5.

C: The number of squares peeled off was equal to or greater than 5 and less than 15.

D: The number of squares peeled off was equal to or greater than 15 and less than 30.

E: The number of squares peeled off was equal to or greater than 30.

A to C are acceptable product levels, and D to E are rejection levels.

<Scratch Resistance (Pencil Hardness)>

After glass was stuck to the printed article of each of the examples and comparative examples, the surface of the image portion and the surface of the ink receiving layer of the non-image portion of the ornamental glass of each of the examples and comparative examples were evaluated by the pencil hardness test method specified in JIS K 5600-5-4. In this method, by using a weight weighing 500 g, the surface of the image portion and the non-image portion was repeatedly scratched 10 times with pencils with various hardnesses, and the scale of the hardest pencil that did not leave scratches was determined.

At the pencil hardness of B, the glass is scratched when construction is performed on the glass. Therefore, the glass having a pencil hardness of B is not preferable. In order to prevent the glass from being scratched even when the surface thereof is rubbed at the time of performing construction on the glass, the glass having a pencil hardness of equal to or greater than H is preferable, and the glass having a pencil hardness of equal to or greater than 2H is more preferable.

<Thickness of Ink Receiving Layer, Interlayer, and Adhesive Layer>

By using a microtome (RM2255 manufactured by Leica Biosystems Nussloch GmbH), cross-section cutting was performed in the inkjet recording sheet on which a color image was not yet printed. By observing the obtained cross-section with a scanning electron microscope (S-4700 manufactured by Hitachi, Ltd.), the film thickness of the ink receiving layer, the interlayer, and the adhesive layer of each sample was measured.

TABLE 1

| | | Example 1 | Example 2 | Example 3 | Example 4 | Example 5 | Example 6 | Example 7 |
|---|---|---|---|---|---|---|---|---|
| Constitution | Ink receiving layer G | Coating solution | G-1 | G-1 | G-1 | G-1 | G-1 | G-1 | G-1 |
| | | Polymerizable compound | Acryl monomer | Acryl monomer | Acryl monomer | Acryl monomer | Acryl monomer | Acryl monomer | Acryl monomer |
| | | Polymerization initiator | Photopolymerization initiator FP-13 | Photopolymerization initiator FP-13 | Photopolymerization initiator FP-13 | Photopolymerization initiator FP-13 | Photopolymerization initiator FP-13 | Photopolymerization initiator FP-13 | Photopolymerization initiator FP-13 |
| | | Surfactant | — | — | — | — | — | — | — |
| | | UV curing condition [mJ/cm$^2$] | 77 | 77 | 77 | 77 | 77 | 77 | 77 |
| | | Thickness [μm] | 14 | 14 | 14 | 14 | 14 | 14 | 14 |
| | Interlayer C | Coating solution | C-1 | C-2 | C-3 | — | — | — | C-1 |
| | | Resin | PE, PU | PE, PU | PE, PU | — | — | — | PE, PU |
| | | Coating solution | B-1 | B-2 | B-3 | B-4 | B-5 | — | B-1 |
| | Interlayer B | Resin | Acryl, PO | Acryl, PO | PE | PE, PU | — | — | Acryl, PO |
| | | Thickness [μm] | 0.3 | 0.4 | 0.4 | 0.8 | — | — | 0.3 |
| | Interlayer A | Coating solution | — | — | — | — | A-1 | A-1 | — |
| | | Resin | — | — | — | — | PE, PU | PE, PU | — |
| | | Thickness [μm] | — | — | — | — | 0.04 | 0.04 | — |
| | Transparent support | Type | PET | PET | PET | PET | PET | PET | PET |
| | Interlayer D (A) | Coating solution | — | — | — | — | A-1 | A-1 | — |
| | | Resin | — | — | — | — | PE, PU | PE, PU | — |
| | | Thickness [μm] | — | — | — | — | 0.04 | 0.04 | — |
| | Interlayer E (B) | Coating solution | B-1 | B-2 | B-3 | B-4 | B-5 | — | E-1 |
| | | Resin | Acryl, PO | Acryl, PO | PE | PE, PU | PE, PU, Acryl | — | Acryl |
| | | Thickness [μm] | 0.3 | 0.4 | 0.4 | 0.8 | 0.5 | — | 0.1 |
| | Interlayer F (C) | Coating solution | C-1 | C-2 | C-3 | — | — | — | — |
| | | Resin | PE, PU | PE, PU | PE, PU | — | — | — | — |
| | Adhesive layer H | Coating solution | H-1 | H-1 | H-1 | H-1 | H-1 | H-1 | H-1 |
| Evaluation | | Release properties of release film | A | A | A | A | A | A | B |
| | | Ink adhesiveness | A | A | B | C | A | B | A |
| | | Scratch resistance (pencil hardness) | 2H | 2H | 2H | 2H | 2H | 2H | 2H |

TABLE 1-continued

| Constitution | | | Example 8 | Example 9 | Example 10 | Example 11 | Example 12 | Example 13 |
|---|---|---|---|---|---|---|---|---|
| | Ink receiving layer G | Coating solution | G-1 | G-1 | G-1 | G-1 | G-1 | G-2 |
| | | Polymerizable compound | Acryl monomer | Acryl monomer | Acryl monomer | Acryl monomer | Acryl monomer | Acryl monomer |
| | | Polymerization initiator | Photopolymerization initiator FP-13 | Photopolymerization initiator FP-13 | Photopolymerization initiator FP-13 | Photopolymerization initiator FP-13 | Photopolymerization initiator FP-13 | Photopolymerization initiator FP-13 |
| | | Surfactant | — | — | — | — | — | — |
| | | UV curing condition [mJ/cm$^2$] | 148 | 148 | 77 | 77 | 77 | 77 |
| | | Thickness [µm] | 14 | 14 | 14 | 28 | 5 | 14 |
| | Interlayer C | Coating solution | C-1 | — | C-1 | C-1 | C-1 | C-1 |
| | | Resin | PE, PU | — | PE, PU | PE, PU | PE, PU | PE, PU |
| | | | B-1 | B-5 | B-1 | B-1 | B-1 | B-1 |
| | | Thickness [µm] | — | — | — | — | — | — |
| | Interlayer B | Coating solution | — | PE, PU | — | — | — | — |
| | | Resin | — | 0.04 | — | — | — | — |
| | | Thickness [µm] | | | | | | |
| | | Resin | Acryl, PO | PE, PU, Acryl | Acryl, PO | Acryl, PO | Acryl, PO | Acryl, PO |
| | | Thickness [µm] | 0.3 | 0.5 | 0.3 | 0.3 | 0.3 | 0.3 |
| | Interlayer A | Coating solution | — | A-1 | — | — | — | — |
| | | Resin | — | — | — | — | — | — |
| | | Thickness [µm] | — | — | — | — | — | — |
| | Transparent support | Type | PET | PET | PET | PET | PET | PET |
| | Interlayer D (A) | Coating solution | — | — | — | — | — | — |
| | | Resin | — | — | — | — | — | — |
| | | Thickness [µm] | — | — | — | — | — | — |
| | Interlayer E (B) | Coating solution | — | — | — | — | — | — |
| | | Resin | B-1 | B-5 | B-1 | B-1 | B-1 | B-1 |
| | | Thickness [µm] | Acryl, PO | PE, PU, Acryl | Acryl, PO | Acryl, PO | Acryl, PO | Acryl, PO |
| | | | 0.3 | 0.5 | 0.3 | 0.3 | 0.3 | 0.3 |
| | Interlayer F (C) | Coating solution | C-1 | — | C-1 | C-1 | C-1 | C-1 |
| | | Resin | PE, PU | PE, PU | PE, PU | PE, PU | PE, PU | PE, PU |
| | Adhesive layer H | Coating solution | H-1 | H-1 | H-2 | H-1 | H-1 | H-1 |
| Evaluation | | Release properties of release film | A | A | A | A | A | A |
| | | Ink adhesiveness | B | B | A | A | A | A |
| | | Scratch resistance (pencil hardness) | 2H | 2H | 2H | 2H | 2H | H |

TABLE 2

| | | | Example 14 | Example 15 | Example 16 | Example 17 | Example 18 | Example 19 | Example 20 |
|---|---|---|---|---|---|---|---|---|---|
| Constitution | Ink receiving layer G | Coating solution | G-3 | G-4 | G-1 | G-1 | G-1 | G-1 | G-1 |
| | | Polymerizable compound | Acryl monomer | Acryl monomer | Acryl monomer | Acryl monomer | Acryl monomer | Acryl monomer | Acryl monomer |
| | | Polymerization initiator | Photopolymerization initiator FP-13 | Photopolymerization initiator FP-13 | Photopolymerization initiator FP-13 | Photopolymerization initiator FP-13 | Photopolymerization initiator FP-13 | Photopolymerization initiator FP-13 | Photopolymerization initiator FP-13 |
| | | Surfactant | MEGAFACE F780 | MEGAFACE F784 | — | — | — | — | — |
| | | UV curing condition [mJ/cm²] | 77 | 77 | 77 | 77 | 77 | 77 | 77 |
| | | Thickness [μm] | 5 | 5 | 5 | 5 | 5 | 5 | 5 |
| | Interlayer C | Coating solution | C-1 | C-1 | C-1 | C-1 | C-1 | C-1 | |
| | | Resin | PE, PU | PE, PU | PE, PU | PE, PU | PE, PU | PE, PU | |
| | | Coating solution | B-1 | B-1 | B-1 | B-1 | B-1 | B-1 | |
| | Interlayer B | Resin | Acryl, PO | Acryl, PO | Acryl, PO | Acryl, PO | Acryl, PO | Acryl, PO | |
| | | Thickness [μm] | 0.3 | 0.3 | 0.3 | 0.3 | 0.3 | 0.3 | |
| | Interlayer A | Coating solution | — | — | — | — | — | — | |
| | | Resin | — | — | — | — | — | — | |
| | | Thickness [μm] | — | — | — | — | — | — | |
| | Transparent support Interlayer D (A) | Type | PET | PET | PET | PET | PET | PET | A4300 |
| | | Coating solution | — | — | — | — | — | — | |
| | | Resin | — | — | — | — | — | — | |
| | | Thickness [μm] | — | — | — | — | — | — | |
| | Interlayer E (B) | Coating solution | B-1 | B-1 | B-1 | B-1 | B-1 | B-1 | |
| | | Resin | Acryl, PO | Acryl, PO | Acryl, PO | Acryl, PO | Acryl, PO | Acryl, PO | |
| | | Thickness [μm] | 0.3 | 0.3 | 0.3 | 0.3 | 0.3 | 0.3 | |
| | Interlayer F (C) | Coating solution | C-1 | C-1 | C-1 | C-1 | C-1 | C-1 | |
| | | Resin | PE, PU | PE, PU | PE, PU | PE, PU | PE, PU | PE, PU | |
| | Adhesive layer H | Coating solution | H-1 | H-1 | H-3 | H-4 | H-5 | H-6 | H-3 |
| Evaluation | Release properties of release film | | A | A | A | A | A | A | A |
| | Ink adhesiveness | | A | A | A | A | A | A | A |
| | Scratch resistance (pencil hardness) | | 2H | 2H | 2H | 2H | H | H | H |

TABLE 2-continued

| Constitution | | | Example 21 | Example 22 | Example 23 | Example 24 | Comparative example 1 | Comparative example 2 | Comparative example 3 |
|---|---|---|---|---|---|---|---|---|---|
| | Ink receiving layer G | Coating solution | G-1 | G-6 | G-7 | G-8 | — | G-5 | — |
| | | Polymerizable compound | Acryl monomer | Acryl monomer | Acryl monomer | Acryl monomer | — | Silanol | — |
| | | Polymerization initiator | Photopolymerization initiator | Photopolymerization initiator | Photopolymerization initiator | Photopolymerization initiator | — | — | — |
| | | Surfactant | FP-13 | GF-1 | GF-2 | GF-3 | — | A, C | — |
| | | UV curing condition [mJ/cm²] | 77 | 77 | 77 | 77 | — | None (sol-gel) | — |
| | | Thickness [μm] | 5 | 5 | 5 | 5 | — | — | — |
| | Interlayer C | Coating solution | | C-1 | C-1 | C-1 | C-2 | C-1 | — |
| | | Resin | | PE, PU | PE, PU | PE, PU | PE, PU | PE, PU | — |
| | Interlayer B | Coating solution | | B-1 | B-1 | B-1 | B-1 | B-1 | B-6 |
| | | Resin | | Acryl, PO | Acryl, PO | Acryl, PO | Acryl, PO | Acryl, PO | PE, PU |
| | | Thickness [μm] | | 0.3 | 0.3 | 0.3 | 0.3 | 0.3 | 0.8 |
| | Interlayer A | Coating solution | | — | — | — | — | — | — |
| | | Resin | | — | — | — | — | — | — |
| | | Thickness [μm] | | — | — | — | — | — | — |
| | Transparent support | Type | A4300 | PET | PET | PET | PET | PET | PET |
| | Interlayer D (A) | Coating solution | | — | — | — | — | — | — |
| | | Resin | | — | — | — | — | — | — |
| | | Thickness [μm] | | — | — | — | — | — | — |
| | Interlayer E (B) | Coating solution | | B-1 | B-1 | B-1 | B-1 | B-1 | B-6 |
| | | Resin | | Acryl, PO | Acryl, PO | Acryl, PO | Acryl, PO | Acryl, PO | PE, PU |
| | | Thickness [μm] | | 0.3 | 0.3 | 0.3 | 0.3 | 0.3 | 0.8 |
| | Interlayer F (C) | Coating solution | | C-1 | C-1 | C-1 | C-2 | C-1 | — |
| | | Resin | | PE, PU | PE, PU | PE, PU | PE, PU | PE, PU | — |
| | Adhesive layer H | Coating solution | H-5 | H-1 | H-1 | H-1 | H-1 | H-1 | H-1 |
| Evaluation | Release properties of release film | | A | A | A | A | A | A | A |
| | Ink adhesiveness | | A | A | A | A | A | E | D |
| | Scratch resistance (pencil hardness) | | H | 2H | 2H | 2H | B | 2H | B |

From Tables 1 and 2, it was understood that the printed article and the ornamental glass of the present invention obtained by forming an image portion on the inkjet recording sheet of the present invention by inkjet printing are excellent in both the ink adhesiveness and the scratch resistance (pencil hardness) of the ink receiving layer including the image portion and the non-image portion.

It was also understood that, in contrast, the printed article and the ornamental glass of Comparative example 1 obtained by forming an image portion on the interlayer C formed of the coating solution C-2, which contains a polymer and a cross-linking agent but does not contain a polymerizable compound and a polymerization initiator, are poor in the pencil hardness of the ink receiving layer including the image portion and the non-image portion.

It was also understood that the printed article and the ornamental glass of Comparative example 2 provided with an ink receiving layer including an image portion and a non-image portion that is cured using the coating solution G-5, which contains silanol but does not contain a polymerization initiator, through a sol-gel reaction were poor in the ink adhesiveness.

It was understood that the printed article and the ornamental glass of Comparative example 3 in which an image portion was formed on the interlayer B formed of the coating solution B-6, which contains a polymer and a cross-linking agent but does not contain a polymerizable compound and a polymerization initiator, were poor in both the ink adhesiveness and the pencil hardness of the ink receiving layer including the image portion and the non-image portion.

The inkjet recording sheet of the present invention was excellent in the release properties of the release film Furthermore, it was understood that from the comparison between the Example 1 and the Example 13 in which the amount of the polymerization initiator added is reduced, when the amount of the polymerization initiator added is reduced at the time of forming the ink receiving layer, the pencil hardness slightly deteriorates.

EXPLANATION OF REFERENCES

1: transparent support
2: ink receiving layer
3A, 3B, 3C, 3D, 3E, 3F: interlayer
5: adhesive layer
6: release film
10: inkjet recording sheet
11: image portion
20: printed article
21: glass
30: ornamental glass

What is claimed is:
1. An inkjet recording sheet comprising:
a transparent support;
an ink receiving layer disposed on one surface side of the transparent support;
an adhesive layer on the other surface side of the transparent support opposite to the surface on which the ink receiving layer is disposed; and
an interlayer constituted with a single layer or two or more layers, at least between the ink receiving layer and the transparent support or between the adhesive layer and the transparent support,
wherein the interlayer includes an interlayer A having a thickness of less than 0.1 µm,
the ink receiving layer contains a surfactant and is a layer formed by curing a composition containing at least a polymerization initiator and a polymerizable compound,
the interlayer A contains a polyester-based resin and a polyurethane resin, and
the surfactant is a fluorine-based surfactant represented by at least any one of the following formulae:

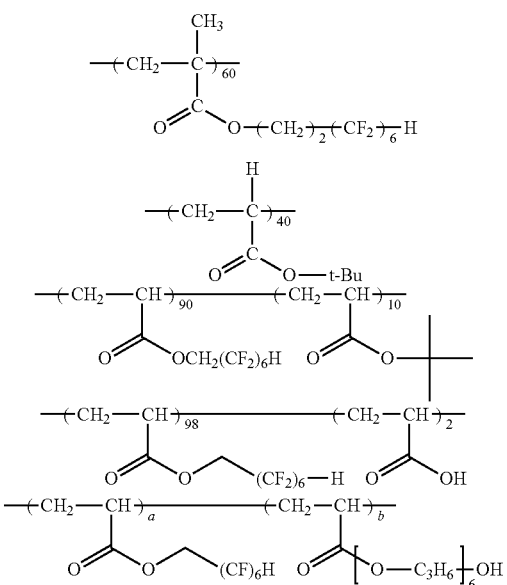

a/b=90/10 (% by mass).
2. The inkjet recording sheet according to claim 1, wherein the transparent support is a polyethylene terephthalate film.
3. The inkjet recording sheet according to claim 1, wherein the interlayer contains at least one kind of resin among a polyester-based resin, a polyurethane-based resin, an acrylic resin, and a polyolefin-based resin.
4. The inkjet recording sheet according to claim 1, wherein at least one of the layers constituting the interlayer is an interlayer B having a thickness of equal to or greater than 0.1 µm and containing a polyolefin-based resin in a proportion of equal to or greater than 10%.
5. The inkjet recording sheet according to claim 4, wherein the interlayer is constituted with two or more layers,
at least one of the layers constituting the interlayer is an interlayer C containing at least one kind of resin among a polyester-based resin and a polyurethane-based resin, and
the interlayer B and the interlayer C are disposed in this order from the transparent support.
6. The inkjet recording sheet according to claim 1 that is used for ornamenting glass.
7. A method for manufacturing a printed article, comprising;
ejecting an ink composition from an inkjet recording device onto the inkjet recording sheet according to claim 1; and
forming an image portion by curing the ejected ink composition by irradiating the ink composition with radiation.

8. A printed article comprising an inkjet recording sheet and an image portion on the inkject recording sheet, wherein the inkjet recording sheet is the inkjet recording sheet according to claim 1.

9. Ornamental glass comprising:
   glass; and
   the printed article according to claim 8 disposed on the glass.

\* \* \* \* \*